United States Patent
Bansal et al.

(10) Patent No.: US 12,289,353 B2
(45) Date of Patent: Apr. 29, 2025

(54) COLLABORATION CONTROLS FOR DOCUMENT SECTIONS

(71) Applicant: Adobe Inc., San Jose, CA (US)

(72) Inventors: Ayush Bansal, Adarsh Nagar (IN); Deep Sinha, Ghaziabad (IN)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 18/328,211

(22) Filed: Jun. 2, 2023

(65) Prior Publication Data

US 2024/0406230 A1 Dec. 5, 2024

(51) Int. Cl.
*H04L 65/401* (2022.01)
*G06F 40/166* (2020.01)
*H04L 9/40* (2022.01)

(52) U.S. Cl.
CPC ........ *H04L 65/4015* (2013.01); *G06F 40/166* (2020.01); *H04L 63/104* (2013.01)

(58) Field of Classification Search
CPC .. G06F 40/166; H04L 63/104; H04L 65/4015
See application file for complete search history.

(56) References Cited

U.S. PATENT DOCUMENTS

| | | | | |
|---|---|---|---|---|
| 9,122,886 B2* | 9/2015 | Lai | ...................... | G06F 21/6209 |
| 11,875,311 B2* | 1/2024 | Fong | .................... | G06Q 10/103 |
| 12,056,664 B2* | 8/2024 | Zionpour | .............. | G06F 16/958 |
| 2017/0285901 A1* | 10/2017 | DeMaris | ............... | G06F 16/164 |
| 2022/0222361 A1* | 7/2022 | Mann | .................. | G06Q 10/103 |
| 2023/0214780 A1* | 7/2023 | Fong | ..................... | G06F 16/176 |
| | | | | 705/7.18 |
| 2023/0244848 A1* | 8/2023 | Hahn | .................... | G06F 40/106 |
| | | | | 715/273 |

OTHER PUBLICATIONS

Workiva. "Advanced Permissions." WorkivaSupport, May 22, 2023, https://support.workiva.com/hc/en-us/articles/360036000311-Advanced-permissions. Accessed Oct. 5, 2023. pp. 1-5 (Year: 2023).*

* cited by examiner

*Primary Examiner* — Thomas J Dailey
(74) *Attorney, Agent, or Firm* — Shook, Hardy & Bacon L.L.P.

(57) ABSTRACT

Methods and systems are provided for facilitating document collaboration in accordance with collaboration controls. In embodiments, an indication of a collaboration control for a collaborator of a document is obtained. The collaboration control generally indicates an edit permission for a document section of the document in relation to the collaborator. Thereafter, a set of collaboration control data for the document is generated. In embodiments, the set of collaboration control data includes the collaboration control indicating the edit permission for the document section of the document in relation to the collaborator. Based on an input (e.g., edit) by the collaborator to the document section of the document, a determination is made, using the set of collaboration control data, as to whether to enable an edit to the document section of the document.

17 Claims, 12 Drawing Sheets

COLLABORATION CONTROLS FOR DOCUMENT SECTIONS

BACKGROUND

Oftentimes, users desire to collaborate on creating documents. As one example, an individual generating a document can share the document with other collaborators and invite the collaborators to view and/or edit the document. In accordance with sharing a document, collaborators may be either permitted to only view the document (e.g., no edits are permitted) or permitted to fully edit the document (e.g., any portion of the document may be edited). Enabling editing of an entire document, however, may result in edits that alter the document in an undesired manner. For instance, a collaborator may add an undesired object to a document, remove a desired object from a document, or modify a particular object in a document in an undesired manner. Efforts to reduce or redact the undesired editing, for example by a document owner, can be time and resource intensive.

SUMMARY

Embodiments of the present disclosure are directed to facilitating document collaboration in accordance with collaboration controls for document sections. In this regard, collaboration controls can be set or assigned for different sections of a document for various collaborators. As such, a particular collaborator may be permitted to edit one section of a document, while being prohibited from editing another section of the document. Enabling editing in a section-by-section manner allows the owner, such as document owner or section owner, to control edits applied to a document. For example, assume a document owner has a design aspect desired to remain in its original form, or only editable by the document owner. In such a case, the document owner can restrict editing access to the particular document section including the design aspect, while enabling collaborators to edit other sections of the document. As another example, assume a document owner desires edits for a first section of the document by a first collaborator and edits for a second section of the document by a second collaborator. In such a case, the document owner can enable editing access of the first section by the first collaborator and disable editing access of the first section by the second collaborator, while enabling editing access of the second section by the second collaborator and disabling editing access of the second section by the first collaborator.

DETAILED DESCRIPTION

Figure 1:
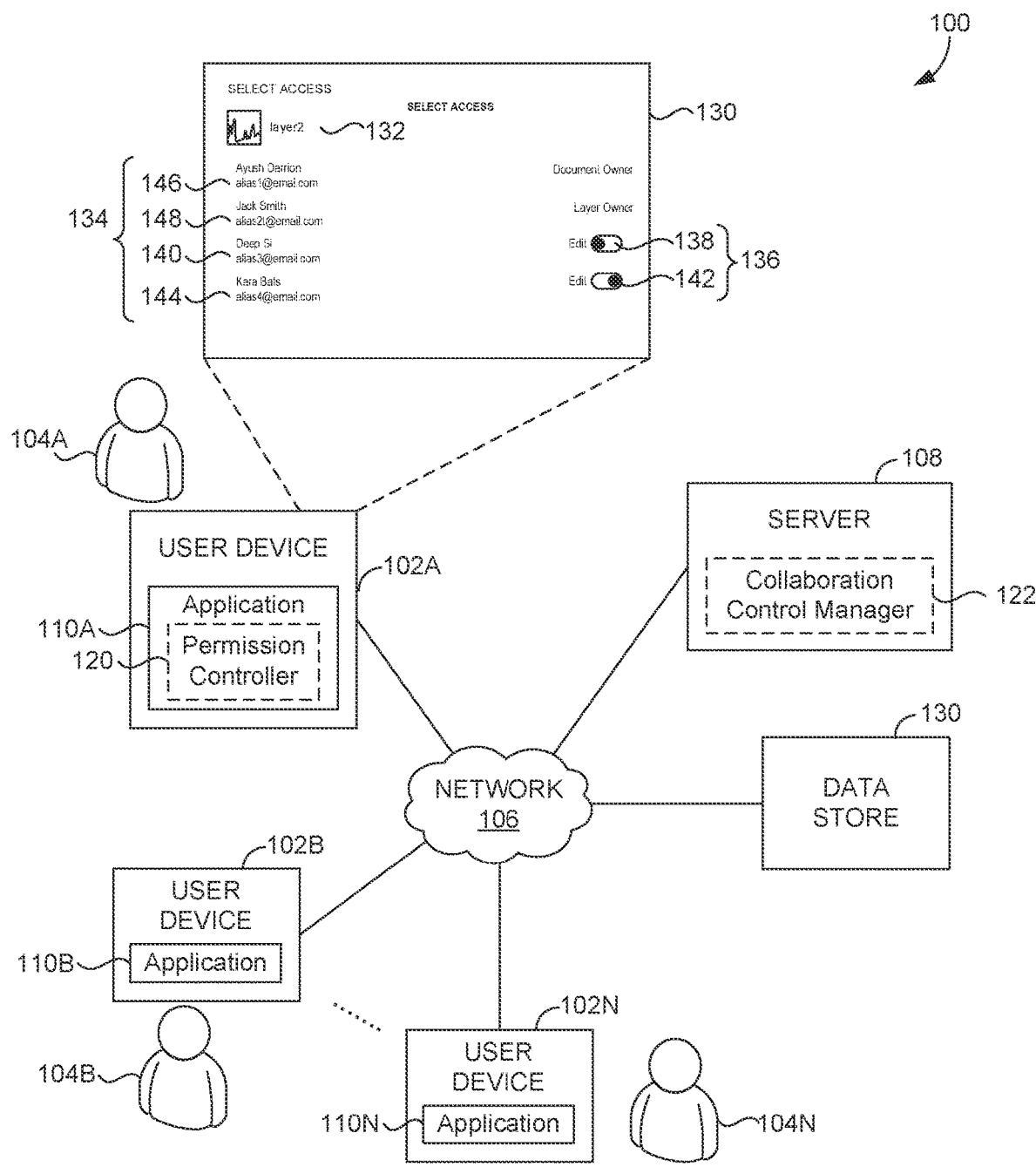
FIG. 1 depicts an example configuration of an operating environment in which some implementations of the present disclosure can be employed, in accordance with various embodiments of the present disclosure.

Individuals oftentimes collaborate to generate a document. In particular, an initial document may be created and multiple individuals, or entities, may contribute input to arrive at a final work product. Typically, in conventional implementations for collaborating on a document, the document may be associated with an edit access that allows the owner or other collaborators to edit the document as desired or a view access that allows only the owner to edit the document as desired and non-owner collaborators can only view the document. With view access, non-owner collaborators are unable to provide edits to the document. As such, a document owner desiring to allow edits to a document generally elects to provide edit access to non-owner collaborators. In such cases, the collaborators can generally provide any type of edit desired throughout the document. For instance, collaborators can add, modify, and/or delete various design aspects. In this regard, the original design or content is unprotected and ownership may become difficult to establish.

Further, such exposed editing may result in undesired editing to a document. For example, by enabling collaborators to edit a document in an unrestricted manner, previous design aspects may be deleted, lost, or modified in an undesired manner. Collaborator edits providing undesired content can result in numerous editing iterations to modify the document to revert back to a previous form or a new form, thereby increasing time and effort to obtain a desired or finalized document. For example, assume a collaborator removes a first design aspect in a document and modifies a second design aspect in the document. Assume now that the owner of the document desired to maintain both design aspects in their original form. In such a case, the owner might need to edit the document to add the first design aspect back into the document and modify the second aspect back to its original form. Such modifications may be tedious and time consuming and, in many cases, difficult to capture as desired. In this way, multiple and time consuming editing iterations may occur in an effort to accurately accomplish desired content in a document.

As obtaining a desired document may be time-consuming and burdensome, particularly when multiple editing iterations are unnecessarily performed to address other collaborator's undesired content modifications, computing and network resources are unnecessarily consumed to facilitate such editing iterations. For instance, computer input/output (I/O) operations are unnecessarily multiplied in an effort to perform various unnecessary edits, such as edits being made to content to address or remove other collaborator's edits. Additionally, such unnecessary editing operations can often result in packet generation costs that adversely affect computer network communication. Each time a user provides edits to a document, for example, the documents, or the contents thereof, can be updated or saved in a remote data store. Accordingly, when the number of accesses and modifications of a document increases to unnecessarily modify a document (e.g., to revert to previous content), there are throughput and network latency costs by communicating over a computer network.

As such, embodiments of the present disclosure are directed to facilitating document collaboration in accordance with collaboration controls for document sections. In this regard, collaboration controls can be set or assigned for different sections of a document for various collaborators. In this way, a particular collaborator may be permitted to edit one section of a document, while being prohibited from editing another section of the document. Enabling editing in a section-by-section manner allows the owner, such as document owner or section owner, to control edits applied to a document. For example, assume a document owner has a design aspect desired to remain in its original form, or only editable by the document owner. In such a case, the document owner can restrict editing access to the particular document section including the design aspect, while enabling collaborators to edit other sections of the document. As another example, assume a document owner desires edits for a first section of the document by a first collaborator and edits for a second section of the document by a second collaborator. In such a case, the document owner can enable editing access of the first section by the first collaborator and disable editing access of the first section by the second collaborator, while enabling editing access of the second section by the second collaborator and disabling editing access of the second section by the first collaborator.

In operation, and at a high level, in accordance with accessing a document, a user, such as a document owner or section owner, inputs or provides collaboration control for a collaborator(s). In embodiments, such selections of collaboration controls are provided via a permission control panel presented to the user. For instance, a permission control panel can present, for a document section, a set of collaborators and collaboration control selections for each collaborator. As such, for a particular document section, a user (e.g., document owner) can set a collaboration control for various collaborators. For instance, a user may select to enable a first collaborator to have edit permissions for a document section and select to disable a second collaborator from having edit permissions for the document section.

By way of example only, and with brief reference to FIG. 1, a permission control panel 130 is shown. Such a permission control panel 130 can be presented via a user device, such as a user device operated by a document owner. The permission control panel 130 corresponds with a document section 132. In this example, the document section 132 is indicated as a second layer of the document. The permission control panel 130 includes a list of collaborators 134 and corresponding collaboration control selectors 136. The list of collaborators 134 may include various collaborators that can have viewing access, editing access, and/or the like. The collaboration control selectors 136 enable the user to select, for each collaborator, a type of access or permission in association with the document section 132. In this example, the collaboration control selector 138 indicates collaborator 140 is enabled to edit the second layer of the document, and the collaborator control selector 142 indicates collaborator 144 is disabled from editing the second layer of the document. Further, in this example, the document owner 146 and the section owner 148 are indicated as such and, by default, are enabled to edit the second layer of the document.

Upon obtaining collaboration control selections, embodiments described herein generate a set of collaboration control data, for example, in association with the document and/or document section. The collaboration control data may include, for example, the collaboration controls for sections of the document, document data (e.g., the owner of the document), section data (e.g., the owner of the section), copyright permissions (e.g., whether a document or section copyright should be maintained during export), and/or the like. In some cases, the set of collaboration control data is included within the document code. In this way, collaboration controls are embedded in association with various sections of the document. In other cases, the collaboration control set is included as a service or settings remote from the document code. Generally, the set of collaboration control data is generated in a manner such that document sections are protected in accordance with desired editing permissions on any platform on which the document is accessed.

In accordance with a collaborator accessing a document, collaboration or editing permissions enabled for the collaborator is based on the assigned collaboration control(s) for the collaborator. As such, in cases in which a collaborator is enabled or permitted to edit a particular document section, any edits provided by the collaborator to that section are allowed. On the other hand, in cases in which a collaborator is not enabled or permitted to edit a particular document section, any edits attempted by the collaborator to that document section are not allowed. In some cases, an error message may be provided indicating that the collaborator is not permitted to make edits in that document section. Alternatively or additionally, a new document section may be generated for enabling the collaborator to make edits in that new document section. For example, assume a collaborator attempts to add new content to a first document section, but the collaborator is not permitted to edit the first document section. In such a case, a new document section may be created, and the collaborator can add the new content to the new document section. In this way, the new content is included in the document, but does not edit or impact the content in the first document section.

Advantageously, controlling collaboration in a document section manner enables collaborators to have editing capabilities for certain portions of a document. Such sectional collaboration control can prevent undesired edits, thereby reducing unnecessary utilization of computing and network resources that may be consumed in conventional implementations to redact undesired edits.

Turning now to FIG. 1, FIG. 1 depicts an example configuration of an operating environment in which some implementations of the present disclosure can be employed, in accordance with various embodiments of the present disclosure. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether for the sake of clarity. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, some functions may be carried out by a processor executing instructions stored in memory as further described with reference to FIG. 7.

It should be understood that operating environment 100 shown in FIG. 1 is an example of one suitable operating environment. Among other components not shown, operating environment 100 includes a number of user or collaborator devices 102A and 102B through 102N (which may be referred to herein as user devices 102 or collaborator devices), network 106, and server(s) 108. Each of the components shown in FIG. 1 may be implemented via any type of computing device, such as one or more of computing device 700 described in connection to FIG. 7, for example. These components may communicate with each other via network 106, which may be wired, wireless, or both. Network 106 can include multiple networks, or a network of networks, but is shown in simple form so as not to obscure aspects of the present disclosure. By way of example, network 106 can include one or more wide area networks (WANs), one or more local area networks (LANs), one or more public networks such as the Internet, and/or one or more private networks. Where network 106 includes a wireless telecommunications network, components such as a base station, a communications tower, or even access points (as well as other components) may provide wireless connectivity. Networking environments are commonplace in offices, enterprise-wide computer networks, intranets, and the Internet. Accordingly, network 106 is not described in significant detail.

It should be understood that any number of user devices, servers, and other components may be employed within operating environment 100 within the scope of the present disclosure. Each may comprise a single device or multiple devices cooperating in a distributed environment.

User devices 102 (also referred to herein as collaborator devices) can be any type of computing devices capable of being operated by a user or collaborator. For example, in some implementations, a user device 102 is the type of computing device described in relation to FIG. 7. By way of example and not limitation, a user device may be embodied as a personal computer (PC), a laptop computer, a mobile device, a smartphone, a tablet computer, a smart watch, a wearable computer, a personal digital assistant (PDA), an MP3 player, a global positioning system (GPS) or device, a video player, a handheld communications device, a gaming device or system, an entertainment system, a vehicle computer system, an embedded system controller, a remote control, an appliance, a consumer electronic device, a workstation, any combination of these delineated devices, or any other suitable device.

The user devices can include one or more processors, and one or more computer-readable media. The computer-readable media may include computer-readable instructions executable by the one or more processors. The instructions may be embodied by one or more applications, such as application 110 (application 110A and 110B through 110N) shown in FIG. 1. Application 110 is referred to as a single application for simplicity, but its functionality can be embodied by one or more applications in practice. As can be appreciated, applications 110A and 110B through 110N can be a same type of application, though not necessarily the same version or even the same application, operating on the various user devices. For example, each application 110 may be an application that provides document design or content functionality (e.g., Adobe® Fresco®, Photoshop®, or Illustrator®) . . . . Generally, applications 110A and 110B through 110N enable users to collaborate on creating and editing documents. Although generally described as performing document collaboration via a server, as can be appreciated, other embodiments may not employ a server to carry out document collaboration function (e.g., via a peer-to-peer network). In such cases, the functionality described herein in association with the server may be performed at other devices, such as user devices 102.

As more fully described below, the user devices 102 may be operated by various users or collaborators of a document collaboration application. To convey aspects of the present technology, various users or collaborators may be described as a document owner and a document editor. A document owner generally refers to a user that creates or owns a document (an initial document). A document editor generally refers to a user that provides edits pertaining to a document. As shown in FIG. 1, for illustrative purposes, the user device 102A is operated by a document owner 104A, and user device 102B is operated by a document editor 104B. Although illustrated in this manner, any one of the user devices 102 is generally operated by a user or collaborator, any of which may create a document, edit a document, and/or view a document.

The applications 110 operating on user devices 102 may generally be any application capable of facilitating the exchange of information between the user devices and, in some embodiments, the server 108 in carrying out document collaboration. In some implementations, the application(s) comprises a web application, which can run in a web browser, and could be hosted at least partially on the server-side of environment 100. In addition, or instead, the application(s) can comprise a dedicated application, such as an application having document design functionality. In some cases, the application is integrated into the operating system (e.g., as a service). It is therefore contemplated herein that "application" be interpreted broadly.

In accordance with embodiments herein, the application can facilitate document collaboration in accordance with collaboration controls for a document section(s). Section-specific collaboration controls generally enables collaboration (e.g., related to an editing of a document) in accordance with a document section(s). To this end, a particular document can be edited by a collaborator(s) in a document section in which the corresponding collaborator is permitted to edit. For example, a first document collaborator may be enabled to edit a first section of a document, and a second document collaborator may be enabled to edit a second section of the document. As another example, a first and second document collaborator may both be permitted to edit a particular section of a document, but not the remainder of the document.

A document to access for editing and/or viewing may be created, for example, by another collaborator or user. For example, as described, a document owner, such as document owner 104A operating user device 102A, can create a design document via the application 110A. To create a graphical design within a document, a document owner may use any graphical design techniques and functionality. For instance, a user may input text into a document, select an image for the document, position or place a graphical element with the document, size a graphical element, or the like. Graphical design techniques used to create a document are not intended to be limited herein.

Upon a user or document owner 104A creating or inputting a graphical design within a document, the document may be shared, via user device 102A, with other users or collaborators, such as users 104B and 104N. For example, in some cases, a document share button may be selected, via a graphical user interface, to initiate sharing of the document with other document collaborators. For instance, document owner 104A may select a document share button. In accordance with selecting the document share button, the document, and/or document data (data associated with a document), can be provided to a server (e.g., server 108) for sharing with other collaborators such that other user devices can access the document.

The document may be stored, for example in data store 130, and accessible to server(s) 108 and various user devices of a document collaboration environment. A user device may access a document in any number of ways. For example, a link can be generated and provided (e.g., via email) to user devices, such as user devices 102B and 102N, for collaborators or editors to access the design document. In other examples, a user may open application 110 and be provided with access to a document (e.g., automatically provided or upon user selection).

Upon accessing a document, such as via user device 102B, application 110 (e.g., application 110B) executing on a user device can present the document to enable design collaboration. In this way, users, such as document editors, can view the document and provide edits related to the document in accordance with collaboration controls for document sections.

As illustrated, application 110, such as application 110A on user device 102A, can include permission controller 120 to enable users, such as document owners and/or section owners, to establish or designate collaboration controls for document sections. As can be appreciated, each application 110 may include a permission controller 120. As described throughout this disclosure, permission controller 120 enables a user to provide, set, or input collaboration controls for document sections. Permission controller 120 may also enable users to view collaboration controls established for various collaborators for various document sections.

A permission controller 120 generally enables selection of collaboration controls for a document and/or sections associated therewith. In this regard, a permission controller 120 can be accessed to indicate or select various collaboration controls for various collaborators in association with a document. A collaboration control generally refers to a control or setting that enables or disables editing of a document or a portion of a document (e.g., a document segment). To this end, a user may interact with application 110, via a graphical user interface, to select or modify a collaboration control. For example, a user may select to access or view a permission control panel. Generally, a document owner and/or a section owner can select collaboration controls and/or modify collaboration controls via a permission control panel. As can be appreciated, although setting and/or modifying collaboration controls via a permission control panel may be permitted by only some collaborators, such as a document owner, in some embodiments, each collaborator may view the collaboration control panel. In this way, a collaborator may view collaboration controls designated for the collaborator and, as described more fully below, in some cases, request to update or modify the collaboration controls for the collaborator.

A permission control panel can include a set of one or more collaborators, such as document owners, section owners, and/or other collaborators, and collaboration control selectors that may be selected in association with the collaborators to indicate collaboration controls. Collaboration control selectors may be in any of a number of formats that may be used to select or otherwise provide an indication of a collaboration control. For instance, a toggle button, a menu item, a text box, and/or the like may be accessed and used to set collaboration controls. In some cases, a listed or presented collaborator may be presented with a corresponding collaboration control selector(s) used to select a collaboration control for the corresponding collaboration.

In some embodiments, a permission control panel may include different portions for various sections of the document. For instance, assume a document includes a first layer and a second layer. In this example, a permission control panel may be accessed that includes a set of collaborators and corresponding collaboration control selector(s) for both the first layer and the second layer of the document. In other embodiments, a permission control panel may be specific to a document section. Continuing with the example that the document includes a first layer and a second layer, in this example, a first permission control panel that includes a set of collaborators and corresponding collaboration control selector(s) may be accessed in association with the first layer. Similarly, a second permission control panel that includes a set of collaborators and corresponding collaboration control selector(s) may be accessed in association with the second layer. In this regard, different permission control panels are accessed in association with the different layers of the document.

As can be appreciated, various collaboration controls can be selected or specified in association with a collaboration control selector. By way of example only, in some embodiments, a collaboration control may be specified in relation to editing a particular section of a document. In some cases, a collaboration control may be more specific to define or specify types of editing that may be performed. For instance, in some cases, collaboration controls may specify whether a collaborator may add content to a document section and/or delete content from a document section. Alternatively or additionally, in some embodiments, a collaboration control may be specified in relation to management of a document. For example, collaboration controls may specify whether a collaborator can delete a document section, copy a document section or a document, share a document section or a document, and/or the like.

One example of a permission control panel 130 is shown. Such a permission control panel 130 can be presented via a user device, such as a user device operated by a document owner. The permission control panel 130 corresponds with a document section 132. In this example, the document section 132 is indicated as a second layer of the document. The permission control panel 130 includes a list of collaborators 134 and corresponding collaboration control selectors 136. The list of collaborators 134 may include various collaborators that can have viewing access, editing access, and/or the like. The collaboration control selectors 136 enable the user to select, for each collaborator, a type of access or permission in association with the document section 132. In this example, the collaboration control selector 138 indicates collaborator 140 is enabled to edit the second layer of the document, and the collaborator control selector 142 indicates collaborator 144 is disabled from editing the second layer of the document. Further, in this example, the document owner 146 and the section owner 148 are indicated as such and, by default, are enabled to edit the second layer of the document.

In some cases, a permission controller 120, for example, using a permission control panel, enables a collaborator to request permission or access to a particular document section. For example, a collaborator, such as document editor 104B, may access a permission control panel and recognize that the particular collaborator is not enabled to edit a particular document section. As such, the user may request permission to edit the particular document section. For example, the user may select a request edit permission button or icon in the permission control panel, thereby triggering a request to be generated and communicated to the document owner and/or section owner. Additionally or alternatively, a user may request to modify permissions to a particular document section. For instance, a user may recognize edit permissions related only to adding content to a particular section. Assuming the user desires to delete content in the particular section, the user may select a request to modify the permission to include content deletion permission for the particular section. In some cases, the various types of permission modifications may be presented for selection. Alternatively or additionally, a message box may be included enabling a collaborator to provide details associated with the request (e.g., a desired type of permission modification, a reason for requesting the permission modification, etc.).

As described herein, collaboration controls can be stored in association with the document such that the collaborations controls are appropriately enforced, irrespective of another access of the document. In this regard, as the document is communicated to other collaborators or accessed by other collaborators, the collaboration controls are maintained with the document such that the collaboration controls are enforced in association with a collaborator attempting to provide edits to the document.

Upon a user, such as a document owner 104A, generating a document and/or designating or confirming collaboration controls for a set of one or more collaborators, the document can be accessed by a collaborator(s) for viewing and/or editing of the document. In this way, upon creating a document, such as a document created by document owner 104A of user device 102A, the document can be accessed by a document editor 104B via user device 102B. The viewing and/or editing of the document by the document editor 104B is controlled or managed by the collaboration control(s) associated with the document editor. For example, a particular document collaborator may be enabled to edit a first section of the document and disabled to edit a second section of the document. In some cases, document collaboration may be automatically implemented in association with the application 110 (e.g., as a default setting). In other cases, a user may select to initiate document collaboration controls. In this regard, a user may select to enable collaboration controls for document sections associated with a document, as described above.

In accordance with a particular collaborator being enabled to edit a document section(s) of a document, the collaborator may perform various edits. In some cases, the particular types of edits may be designated in the collaboration controls, such that only some types of edits are enabled, while other types of edits are disabled. For example, in association with enabling a collaborator to contribute to a particular document section, the collaborator may only be permitted to add to or supplement the design (and not remove any portion of the design).

Document edits may be made using any of a variety of graphical design tools and functionality, for example, provided in association with application 110. By way of example only, a user, such as document editor 104B of user device 102B, may utilize design editing tools to modify position, size, scale, shape, style, format, etc. associated with a graphical design element.

Document edits may be in the form of design-based edits and/or text-based edits pertaining to a design document. Generally, edits, or document edits, refers to edits (e.g., additions, removals, modifications, etc.) made to or provided for a design document. Document edits may include text-based edits and design-based edits. Text-based edits refers to edits provided in text. For example, a document editor may provide text-based edits pertaining to the text content in the document. Design-based edits generally refers to non-text edits made to a graphical design element within the design document. Stated differently, design-based edits refers to a modification of the design (e.g., layout) of a graphical design element(s) within the design document. Design-based edits may include, for example, modification of size, position, placement, type, layout, etc. of a graphical design element within a design document.

In some implementations, to design document edits, a document editor may select to provide design document edits via selection of an editing tool or element presented via a graphical user interface. An editing tool or element generally refers to a component presented via a graphical user interface that enables a user to provide design document edits (e.g., design-based edits and/or text-based edits). An editing tool may be visually represented via a graphical user interface in any number of ways, such as, for example, an icon or button. By selecting an editing tool, text-based edits and/or design edits can be provided by a user.

Edits may be provided by a user in any number of ways. In some embodiments, a user may select a graphical display element of the document for which to provide edits. For example, a user may highlight or select a particular graphical display element corresponding to edits to be provided. In accordance with selecting a graphical display element, a user may provide text-based edits and/or design-based edits. To provide edits, a user may manipulate the selected graphical display element in any number of ways. For example, a user may utilize one or more design editing tools to modify a position, scale, size, color, format, style, or the like, associated with a graphical element. In embodiments, a user may provide edits by adding or creating graphical elements. Although various embodiments describe inputting both text-based edits and design-based edits in association with a graphical element, as can be appreciated, both types of edits are not necessary.

With continued reference to FIG. 1, as described herein, server 108 can facilitate document collaboration in accordance with collaboration controls for document sections via collaboration control manager 122. Server 108 includes one or more processors, and one or more computer-readable media. The computer-readable media includes computer-readable instructions executable by the one or more processors. The instructions may optionally implement one or more components of collaboration control manager 122, described in additional detail below. As can be appreciated, aspects of the collaboration control manager 122 may be performed via the permission controller 120, and vice versa. For example, in a peer-to-peer environment, the permission controllers 120 on the user device(s) may perform functions described herein in association with the collaboration control manager 122.

At a high-level, collaboration control manager 122 can generally manage user collaboration related to a document. In particular, in accordance with embodiments described herein, the collaboration control manager 122 can facilitate document collaboration in accordance with collaboration controls for document sections. As described in more detail in relation to FIG. 2, the collaboration control manager 122 can manage the collaboration controls and/or collaborations, such as document edits (e.g., modifications, additions, or removals) in association with a document. In this way, the collaboration control manager 122 enables document collaboration based on designated collaboration controls for document sections. For example, one collaborator may be permitted to contribute to the design of one section of a document, while another collaborator may not be permitted to contribute to the design of that section of the document.

In some embodiments, the collaboration control manager 122 is integrated with or accessible to a document collaboration service. In this regard, the collaboration control manager 122 can operate in connection with a document collaboration service that enables content creation and/or editing from a set of collaborators. Exemplary document collaboration services include Adobe® Fresco®, Photoshop®, Illustrator®, Adobe® XD, Lightroom®, InDesign®, and Adobe® Express™. These are provided as examples only and are not intended to limit the scope of embodiments described herein.

For cloud-based implementations, the instructions on server 108 may implement one or more components of collaboration control manager 122, and application 110 may be utilized by a user to interface with the functionality implemented on server(s) 108. In some cases, application 110 comprises a web browser. In other cases, server 108 may not be required. For example, the components of collaboration control manager 122 may be implemented completely on a user device or set of user devices, such as user devices 102. In this case, collaboration control manager 122 may be embodied at least partially by the instructions corresponding to application 110.

It should be appreciated that collaboration control manager 122 may be provided via multiple devices arranged in a distributed environment that collectively provide the functionality described herein. Additionally, other components not shown may also be included within the distributed environment. In addition, or instead, collaboration control manager 122 can be integrated, at least partially, into a user device, such as user device 102. Furthermore, collaboration control manager 122 may at least partially be embodied as a cloud computing service.

Data store 130, accessible to permission controller 120 and/or collaboration control manager 122, can store computer instructions (e.g., software program instructions, routines, or services) and data used in embodiments described herein. In some implementations, data store 130 stores information or data received via the user devices 102 and/or server 108 and provides the user devices 102 and/or server 108 with access to that information or data, as needed. Although depicted as a single component, data store 130 may be embodied as one or more data stores. Further, the information in data store 130 may be distributed in any suitable manner across one or more data stores for storage (which may be hosted externally). In embodiments, data stored in data store 130 includes documents, collaboration controls, and/or the like.

Figure 2:
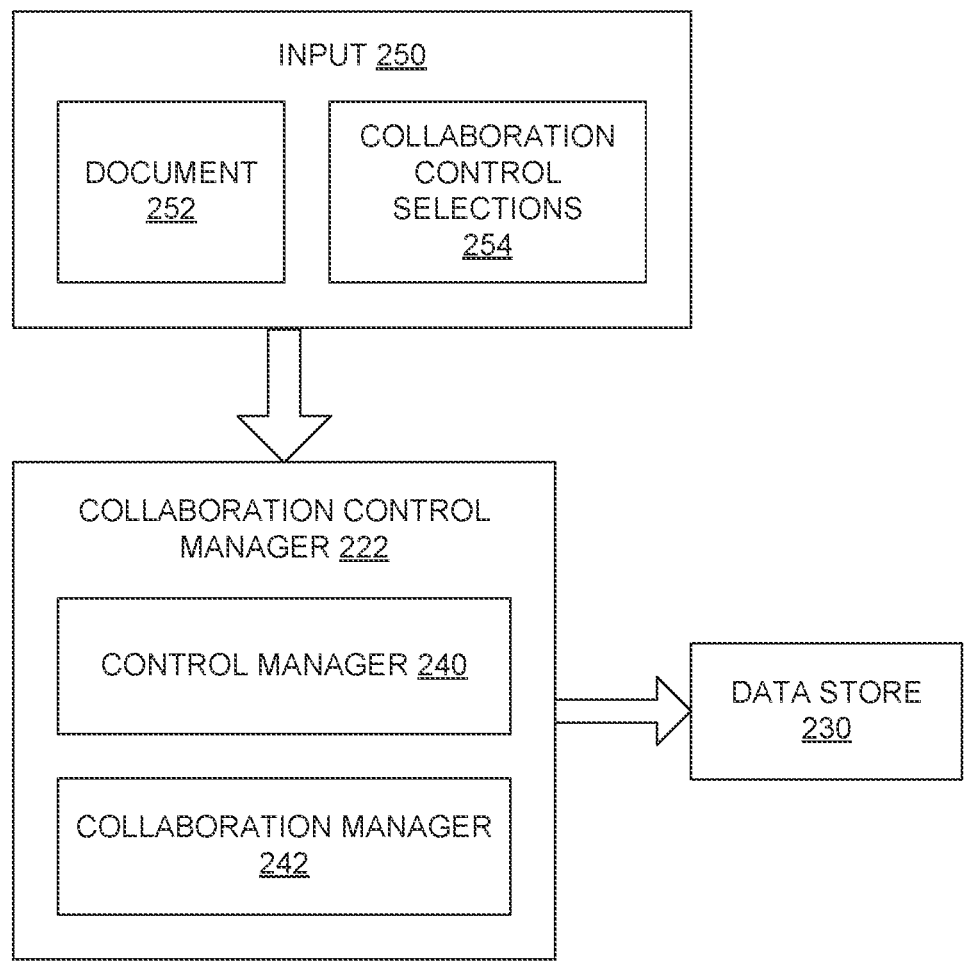
FIG. 2 depicts an exemplary system for facilitating document collaboration in accordance with collaboration controls for document sections, in accordance with various embodiments of the present disclosure.

Turning now to FIG. 2, FIG. 2 illustrates an example implementation for facilitating document collaboration in accordance with collaboration controls for document sections, via collaboration control manager 222. The collaboration control manager 222 can communicate with the data store 230. The data store 230 is configured to store various types of information accessible by the collaboration control manager 222 or other server or device. In embodiments, user devices (such as user devices 102 of FIG. 1) and/or servers or services (e.g., including collaboration control manager 222) can provide data to the data store 230 for storage, which may be retrieved or referenced by any such component. As such, the data store 230 may store collaborator data, such as collaboration controls, collaborator identifiers, and/or the like. In addition, data store 230 may store document content, which can then be accessed for subsequent use or display.

In operation, the collaboration control manager 222 is generally configured to manage document collaboration in accordance with collaboration controls for document sections. In this regard, the collaboration control manager 222 can manage generation or assignment of collaboration controls and/or utilization of collaboration controls. In embodiments, the collaboration control manager 222 includes a control manager 240 and a collaboration manager 242. According to embodiments described herein, the collaboration control manager 222 can include any number of other components not illustrated. In some embodiments, one or more of the illustrated components 240 and 242 can be integrated into a single component or can be divided into a number of different components. Components 240 and 242 can be implemented on any number of machines and can be integrated, as desired, with any number of other functionalities or services.

The collaboration control manager 222 may receive input 250 to initiate generation of collaboration controls and/or utilization of collaboration control(s). Input 250 may include a document 252. A document 252 generally includes any type of content, including text and/or designs. Input may include collaboration control selections 254. For example, collaboration control selections or input may be provided via a user device and communicated to the collaboration control manager 222 for effectuating the selected collaboration controls. In some cases, collaboration control selections may be provided by a document owner and/or a section owner. In this way, an individual that created the document can control access in association with various sections of the document and/or an individual that created a particular section of the document can control access in association with the particular section of the document.

Although not illustrated, input 250 may include other information communicated in association with performing document collaboration in accordance with collaboration controls for document sections. For example, and as described below as one implementation, a section access request may be provided as input to request editing access to a particular section of the document. As another example, an edit attempt may be provided as input by a collaborator in an effort to provide an edit to a document.

The control manager 240 is generally configured to manage collaboration controls. As described, a collaboration control generally refers to a control or setting that enables or disables editing of a document or a document section. In this way, a collaboration control can provide various types of permissions associated with a document and/or document section. A collaboration control associated with a document section can enable editing of the document section or disable editing of the document section. Other types of collaboration controls are also described herein. For example, a collaboration control may permit copying of a document or section, viewing of a document or section, deleting a document or section, generating a new section, etc. A document section is referred to broadly herein to indicate any section or portion of a document. A document section may be defined in any of a number of ways. In some cases, a document section may be defined via layers. In other cases, a document section may be defined or designated based on a position with the document, an object(s) within the document, a type of content (e.g., text or visual design), and/or the like.

As described herein, collaboration controls can be assigned or established for a document and/or document sections via a permission control panel, or data associated therewith. In this regard, in some cases, the control manager 240 generates a permission control panel, or data associated therewith. As described, a permission control panel can be accessed or used to indicate or select various collaboration controls for various collaborators in association with a document. To this end, a user (e.g., a document owner or a section owner) may interact with a permission control panel, via a graphical user interface, to select or modify a collaboration control(s).

A permission control panel can include an indication of a set of one or more collaborators and a set of collaboration control selectors that may be selected in association with the collaborators to indicate collaboration controls. The collaborators may include a document owner(s), a section owner(s), and/or other collaborator(s). A document owner generally refers to an individual or entity that created or owns the document. A section owner generally refers to an individual or entity that created or owns a section of the document. Other collaborators may include other individuals that have been provided with access to the document and/or document section (e.g., document editors). Such collaborators may be referred to herein as non-owner collaborators.

The particular collaborators, including document and/or section owner, identified for including in a permission control panel may be identified in any of a number of ways. In some cases, an individual, such as a document owner, may explicitly input or specify individuals desired to be listed as a collaborator in the permission control panel. In other cases, individuals to list as a collaborator in the permission control panel may be identified based on individuals with which the document is shared. By way of example only, assume an individual initiates creation of a document. In some cases, the document may be an initial document with no content. In other cases, the document may include content added by the individual. Now assume the document owner selects to invite other individuals to collaborate in association with the document. For instance, a user may select, from a drop-down list to invite people and, thereafter, provide email addresses and an optional message for one or more collaborators with whom the user would like to share the document. In some embodiments, the user may initially provide indications of collaboration controls in association with sharing the document. In this way, the user may specify edit permissions and/or view permissions associated with the entire document and/or document sections. Another example of identifying individuals for including in the set of collaborators may include any individuals that received or have access to the document, any individuals that have performed any edit in association with the document, and/or the like.

As described, the permission control panel may include collaboration control selectors. A collaboration control selector can include a user interface element that enables a user to select or indicate a collaboration control for a collaborator of a document. Collaboration control selectors may be in any of a number of formats that may be used to select or otherwise provide an indication of a collaboration control. For instance, a toggle button, a menu item, a text box, and/or the like may be accessed and used to set collaboration controls. In some cases, a listed or presented collaborator may be presented with a corresponding collaboration control selector(s) used to select a collaboration control for the corresponding collaboration.

As can be appreciated, various collaboration controls can be selected or specified in association with a collaboration control selector(s). By way of example only, in some embodiments, a collaboration control may be specified in relation to editing a particular section of a document. In some cases, a collaboration control may be more specific to define or specify types of editing that may be performed. For instance, in some cases, collaboration controls may specify whether a collaborator may add content to a document section and/or delete content from a document section. Alternatively or additionally, in some embodiments, a collaboration control may be specified in relation to management of a document. For example, collaboration controls may specify whether a collaborator can delete a document section, copy a document section or a document, share a document section or a document, and/or the like.

In some embodiments, a permission control panel may include different portions for various sections of the document. For instance, assume a document includes a first layer and a second layer. In this example, a permission control panel may be generated and/or provided that includes a set of collaborators and corresponding collaboration control selector(s) for both the first layer and the second layer of the document. In other embodiments, a permission control panel may be specific to a document section. Continuing with the example that the document includes a first layer and a second layer, in this example, a first permission control panel that includes a set of collaborators and corresponding collaboration control selector(s) may be accessed in association with the first layer. Similarly, a second permission control panel that includes a set of collaborators and corresponding collaboration control selector(s) may be accessed in association with the second layer. In this regard, different permission control panels are generated and provided in association with the different layers of the document. For instance, upon selecting a first layer, a user may select to view a permission control panel associated with the first layer. Thereafter, the user may select a second layer and, thereafter, select to view a permission control panel associated with the second layer.

In some cases, default collaboration controls may be initially designated or assigned. For example, in accordance with identifying a set of collaborators, a default collaboration control associated with each collaborator may initially be set. In one example, a default settings may include enabling or permitting edit permissions associated with the document owner and the section owner, while edit permissions are disabled for other collaborators.

In accordance with generating a permission control panel, or data associated therewith, the control manager 240 can provide a permission control panel, or data associated therewith, to the user device. For example, in association with providing a document to a user device for display, the permission control panel, or data to present in association with a permission control panel, is provided. Such permission control panel data may be included in metadata associated with the document or accessible to the document. In some cases, such data may be provided in response to a request. For example, a user viewing a document may select to view a permission control panel. Based on such a request, the permission control panel, or data associated therewith, may be provided to the user device for display.

As described, a user device may present a permission control panel to a user. In some cases, the permission control panel is automatically presented, for example, in connection with creating or editing a document, creating or editing a section of the document, and/or in accordance with sharing the document with other collaborators. In other cases, the permission control panel is presented based on a user indication to view a permission control panel. As one example, a user may navigate to a settings view and, within the view, select to view a permission control panel. As another example, a user may select to view a permission control panel in association with a selection of a particular document segment. For instance, a user may right click or hover over a particular layer of a document to view a menu and, within the menu, select to view a permission control panel associated with that particular layer.

In accordance with presentation of a permission control panel, a user may select or provide an indication of collaboration controls. In particular, a user may select or provide an indication of collaboration controls for a particular section(s) of a document via a permission control panel. As one example, upon creating content in association with a document, the document owner may select or provide an indication of collaboration controls for each section (e.g., layer) of the document. By way of example only, assume a document includes five different layers. In such a case, for each layer of the document, the document owner may specify a collaboration control for each collaborator presented via a permission control panel. As another example, as a new section is created, a document owner or a section owner may specify a collaboration control for each collaborator presented via a permission control panel.

As updates or modifications to collaboration controls are made, for example by a user operating via a user device, the control manager 240 can update the permission control panel. For instance, as a new section of content (e.g., a layer) is added to a document, a new permission control panel, or data associated with therewith, may be created for providing in association with the new section of the document.

In some cases, the control manager 240, for example, using a permission control panel, enables a collaborator to request permissions or access to a particular document section. For example, a collaborator may access a permission control panel and recognize that the particular collaborator is not enabled to edit a particular document section. As such, the user may request permission to edit the particular document section. For example, the user may select a request edit permission button or icon in the permission control panel, thereby triggering a request to be generated and communicated to the document owner and/or section owner. Additionally or alternatively, a user may request to modify permissions to a particular document section. For instance, a user may recognize edit permissions related only to adding content to a particular section. Assuming the user desires to delete content in the particular section, the user may select a request to modify the permission to include content deletion permission for the particular section. In some cases, the various types of permission modifications may be presented for selection. Alternatively or additionally, a message box may be included enabling a collaborator to provide details associated with the request (e.g., a desired type of permission modification, a reason for requesting the permission modification, etc.). Based on receiving an input or request of a desire modify a collaboration control, the control manager 240 can provide the request to the document owner and/or section owner. As such, the document owner and/or section owner can view the request and may then modify the collaboration control as desired.

In accordance with obtaining collaboration controls, the control manager 240 can generate a set of collaboration control data. In embodiments, upon obtaining collaboration controls, for example from a user device (e.g., associated with a document owner or a section owner), the control manager 240 can generate or update a set of collaboration control data. In this regard, the control manager 240 may generate or update a collaboration control set in association with sections of the document. In this way, for a particular section of the document, a set of collaborators and corresponding collaboration controls are associated. In some cases, a default collaboration control set may be initially established. For instance, in accordance with default collaboration controls included in an initial default permission control panel, the default collaboration controls can be used to generate a collaboration control set. In other cases, a collaboration control set may be generated upon receiving approval or selection of collaboration controls via the permission control panel. As can be appreciated, the control manager 240 is generally configured to update collaboration control set(s) as selections of collaboration controls are input, for example, via a user of a user device.

A set of collaboration control data, or collaboration control sets, are generated or updated to be accessible to the document. As such, the collaboration control sets can be supported across applications and/or platforms. For instance, a collaboration control set for a document generated in association with one design application are available and enforced when the document is opened in another design application. As such, the collaboration controls are more globally enforced, thereby providing more effective editing control of documents and ownership tracking.

A set of collaboration control data may include any type of collaboration data to indicate collaboration controls. For example, a collaboration control set may include a document owner identifier, a section owner identifier, a user identifier or group identifier associated with entities having permission to a particular section(s), a user identifier or group identifier associated with entities having permission to export or copy a document or a particular section(s) of the document, an indication of whether document and/or section copyright should be maintained during export, etc.

In some cases a collaboration control set may be generated within document metadata. For example, the control manager 240 may generate or include metadata related to collaboration controls in association with the document. As one example of implementation of document metadata, the following details can be included in the metadata to identify the owner of the document and whether the document copyright should be maintained during export:

```
{
    "document_owner" : "document owner id",
    "document_export_allowed" : true
}
```

In each document section, such as in association with each layer in a document, the following details can be included in the metadata to identify whether a user has access to that particular document section and if the copyright for the document section should be maintained or not through export:

```
{
    "section owner" : "section owner id",
    "section_export_allowed" : true
    "collaborator_access" :
    [
        {"collaborator1 id" : true},
        {"collaborator2 id" : false},
        ...
    ]
}
```

As can be appreciated, in some embodiments, the collaboration control set may include ownership data. In this regard, ownership associated with various document sections, or edits, can be maintained. In some cases, when the document owner reuses any of the document sections, the ownership information of each document section is preserved. Document owners and/or section owners may be enabled to indicate whether to lock sharing of the corresponding document or section. In cases in which sharing is allowed, the ownership information can be maintained along with other collaboration control data. Advantageously, section owners can track usages and change permissions.

Additionally or alternatively, a collaboration control set may be generated separate from the document, but otherwise accessible to the document. For example, collaboration control sets can be stored in a data store that can be referenced or accessed to lookup collaboration controls to enforce in association with a document, or document sections associated therewith.

In some cases, the control manager 240 may determine a manner in which to generate a collaboration control set. For instance, the control manager 240 may determine whether to generate a collaboration control set as metadata for a document or accessible to a document. In one example, such a determination may be based on a mode in which the application or the document is opened. In a single editing mode, only one user can be present in a document. Generally, in a single editing mode, if a user attempts to open a document while another user is accessing or working on the same document, a conflict avoidance dialog is generally presented to provide notice that another user is currently editing the document. In case a single editing mode is implemented, in some embodiments, the control manager 240 may determine to generate a collaboration control set in association with document metadata. For example, using metadata stored in a cloud document, the permission control panel can provide the current permissions of the users. Modifications made via the permission control panel can result in updates in metadata, and the metadata is updated on cloud when the document is saved. In this case, when a user attempts to perform any operation on a section of the document, depending on the collaboration controls for that section, stored in the document metadata, the user is either allowed to perform the operation or prevented from performing the operation.

In a live editing mode, multiple users are allowed to work on a document simultaneously. In live editing mode, when a user makes a modification to a collaboration control via a permission control panel, such a modification is applied (e.g., via a separate service) to the document metadata on the cloud and locally on device. Accordingly, the synchronization between collaboration controls is maintained when the document is opened by multiple users. When a user attempts to perform any operation in association with a particular section of the document, depending on the permission against that section presented in the document metadata, the user is either allowed to perform the operation or prevented from performing the operation.

The collaboration manager 242 is generally configured to manage collaboration in association with a document. In embodiments described herein, the collaboration manager 242 manages collaboration in association with document sections in accordance with collaboration controls associated with the document sections. In this way, a collaborator may be enabled to or disabled from editing a document section(s) based on a collaboration control designated for the collaborator in association with the document section(s).

In operation, the collaboration manager 242 receives or obtains inputs to edit a document, or a document section associated therewith. For example, a collaborator may indicate to add a design aspect to a particular document section.

In accordance with the edit attempted by the collaborator, the collaboration controls relevant to the collaborator and the particular design section can be accessed and used to determine whether to permit the edit. For example, assume the collaboration control established for the collaborator for the particular document section enables any type of edit to the particular document section. In such a case, the edit is permitted. As another example, assume the collaboration control established for the collaborator for the particular document section enables only additional edits to the particular document section. In such a case, an edit to delete an object is not permitted. As yet another example, assume the collaboration control established for the collaborator for the particular document section disables any edits to the particular document section. In such a case, the edit is not permitted. As described, the collaboration controls used to enforce edit permissions may be included within the document metadata or otherwise accessible in association with the document.

In cases in which an edit is permitted, the edit can be saved or stored in association with the document and/or presented. For example, applied edits can be presented to a user, via a user device, such that the user can view the edits. The edits can also be saved with the document such that when the document is subsequently accessed the edits are presented to the accessing viewer.

In cases in which an edit is not permitted based on a collaboration control(s), the collaboration manager 242 may effectuate disabling of edits in any number of ways. As one example, an edit may be prohibited and an alert or error message may be provided for display to the user. For example, upon attempting an edit to an object in a document section in which the user is not permitted to edit, the user may be provided, via a graphical user display, of an error message. In some cases, the error message may indicate the user is not permitted to provide edits in association with the particular document section. Such an error message may, in some cases, include other details associated with the collaboration control. For example, a user that set the collaboration control, a date for establishing the collaboration control, an indication of whether the collaboration control is a default setting or user-selected setting, a type of edit for which the collaboration control is applicable, a duration of the collaboration control, a list of document sections for which the user is permitted to edit and/or not permitted to edit, etc.

Additionally or alternatively, the collaboration manager 242 may facilitate generation of a new document section in which the user may provide edits. For example, assume a user is prohibited from editing in any section of the document. Further assume the user attempts to add a new object to one of the sections of the document. In such a case, a new document section may be automatically created and the new object added to the new document section. Adding a new document section enables the edit to be recognized or maintained, while not affecting the other sections of the document. As such, in the new object is not desired by the document owner, the new document section can simply be deleted to remove the new object without impacting the remaining document.

As can be appreciated, in some embodiments, the collaboration manager 242 manages collaboration in association with document sections in accordance with collaboration controls associated with the document sections irrespective of attempted edits. In this regard, as a user accesses a document section, editing may be disabled for the collaborator in association with a collaboration control, to prohibit the collaborator from editing that section. By way only, assume a collaborator control for a collaborator indicates the collaboration does not have editing access in a particular document layer. Now assume the collaborator selects the particular document layer. In such a case, editing tools can be disabled such that the collaborator cannot select any tools to edit the particular document layer.

In some cases, synchronization conflicts occur. A synchronization conflict may occur when a cloud document is being accessed on multiple devices simultaneously. In such cases, the collaboration manager 242 may manage conflicts by committing new edits in a new document section(s) and avoiding producing multiple copies. Such conflict manage allows a document owner to have more control over the document and block changes if so desired. Further, such conflict management provides an efficient and effective management of the document. For instance, as compared to conventional implementations in which multiple duplicates of a document would occur due to conflicts if co-editing is permitted, various duplicates of the documents are reduced or eliminated in accordance with embodiments described herein, for example, as edits might not overlap when editing different document sections. By way of example only, in case of conflict, if there are no overlapping changes (e.g., different sections are edited), the edits can be saved (e.g., simultaneously) and a new copy need not be created.

Turning to FIGS. 3A-3F, FIGS. 3A-3F provide exemplary graphical user interfaces for use in implementing embodiments described herein. These are illustrative graphical user interfaces and not intended to limit the scope of embodiments described herein. With initial reference to FIG. 3A, assume a document owner creates a document 302. In creating the document 302, the document owner can use various editing tools 304 to edit the document 302. The document may be edited in various sections. In this example, document sections are in the form of layers, including layers 306, 308, 310, 312, 314, 316, and 318. Assume the document owner views a menu in association with a particular layer. For example, the document owner selects layer 310 and, in association with selecting layer 310, the document owner may select to view a menu (e.g., right clicking on the layer representation 310). As shown, a menu 319 may be presented with various options available for the document owner. Assume the document owner desires to set collaboration controls for various collaborators. As such, the document owner can select the "select access" option 320.

Figure 3A:
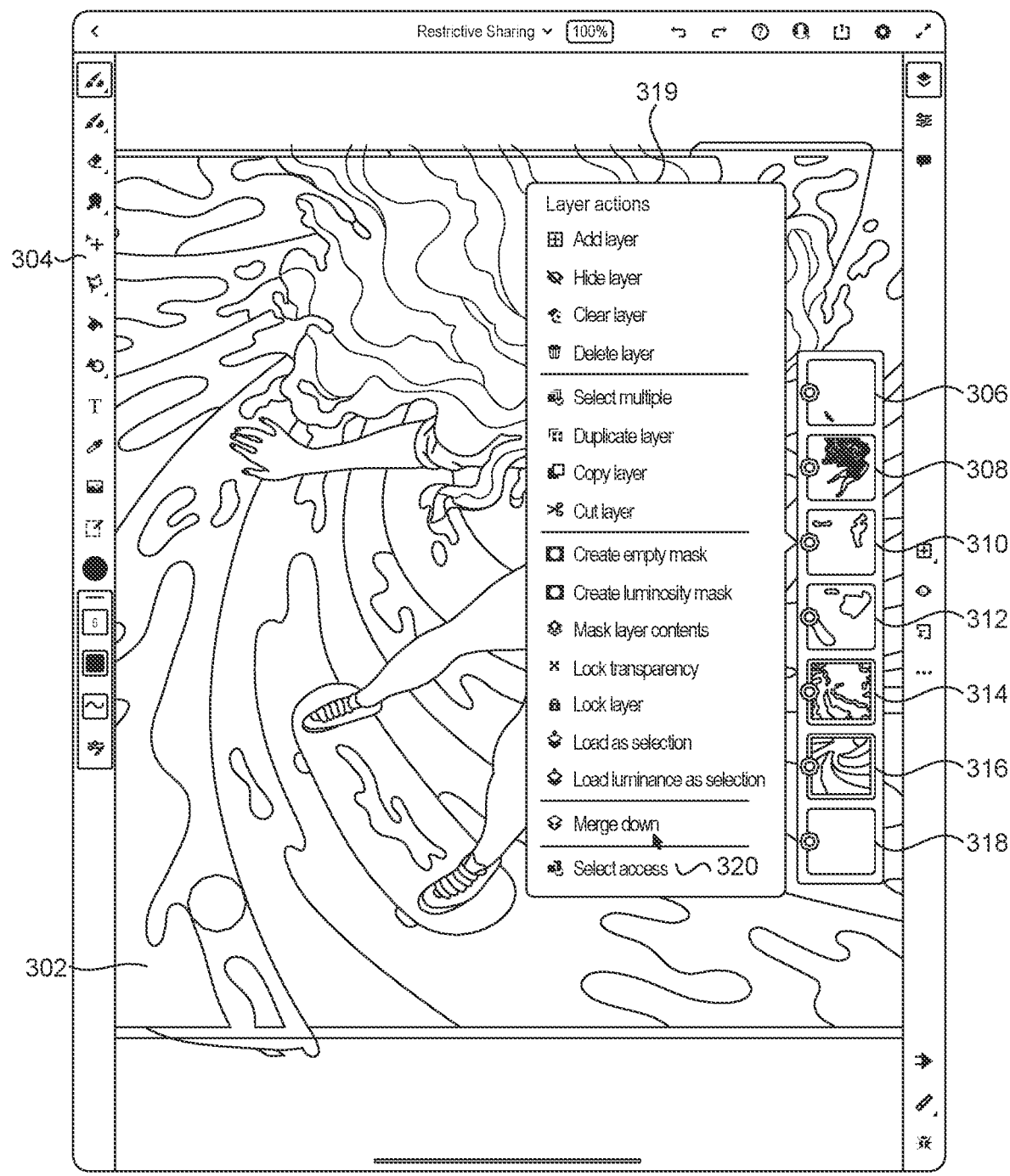
FIGS. 3A-3F provide example graphical user interfaces in accordance with embodiments described herein.
Figure 3B:
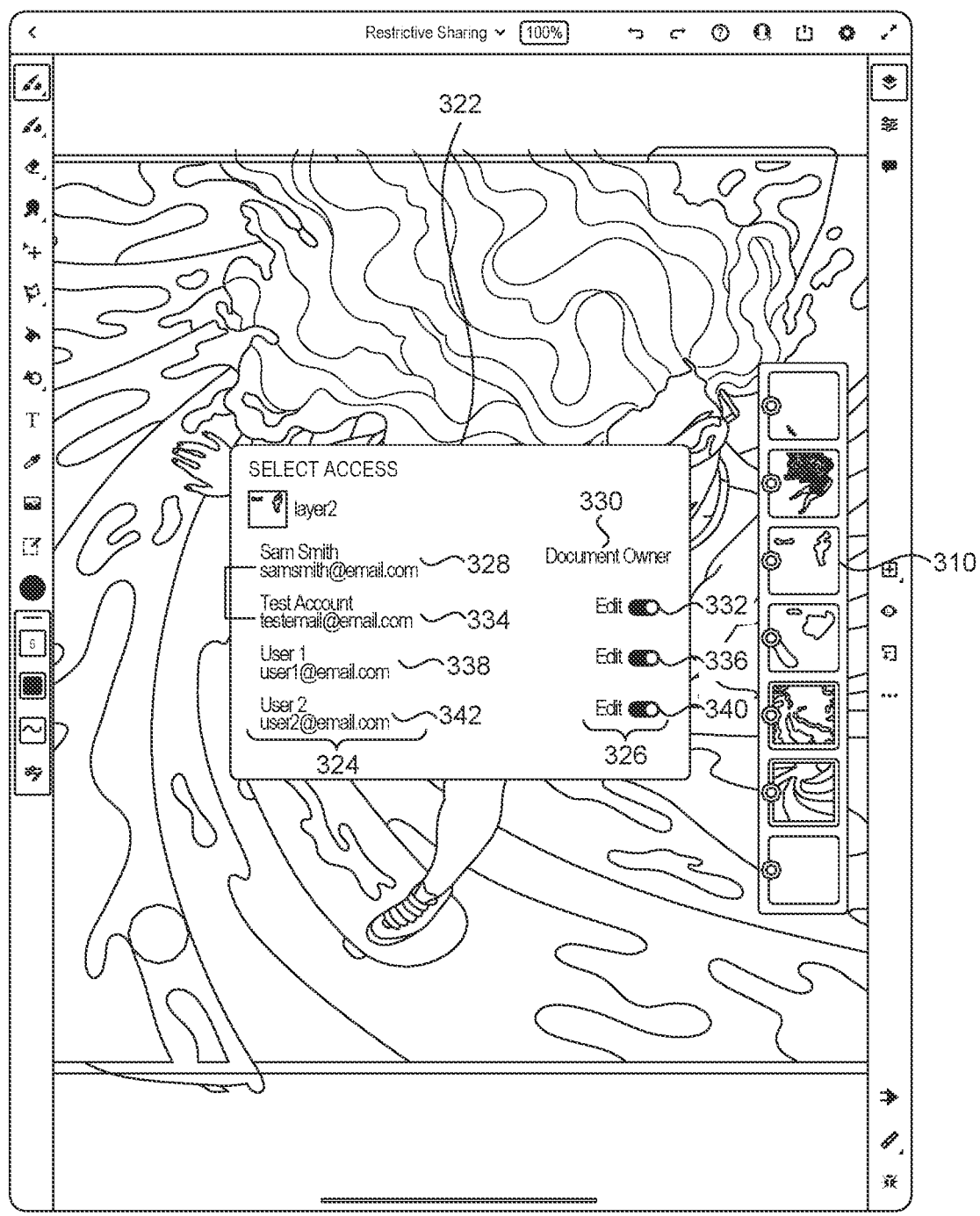

Turning to FIG. 3B, a permission control panel 322 is provided. As shown, the permission control panel 322 includes a list of collaborators 324 and corresponding collaboration control selectors 326. For the document owner 328, the collaboration control 330 is already configured (e.g., via a default collaboration control). The other collaborators presented in the list of collaborators may be determined in any number of ways. In some examples described herein, the list of collaborators is based on the individuals or entities with which the document is shared. The user can designate, via the collaboration control selectors, permissions in association with the selected layer 310, identified in the permission control panel as "layer 2." Based on a user's selection and/or a default configuration, collaboration control selector 332 enables editing for collaborator 334, the collaboration control selector 336 enables editing for collaborator 338, and collaborator control selector 340 enables editing for collaborator 342. As can be appreciated, some or all of such permissions may be initially set as a default (e.g., editing enabled or editing disabled), which may be modified by the document owner.

Figure 3C:
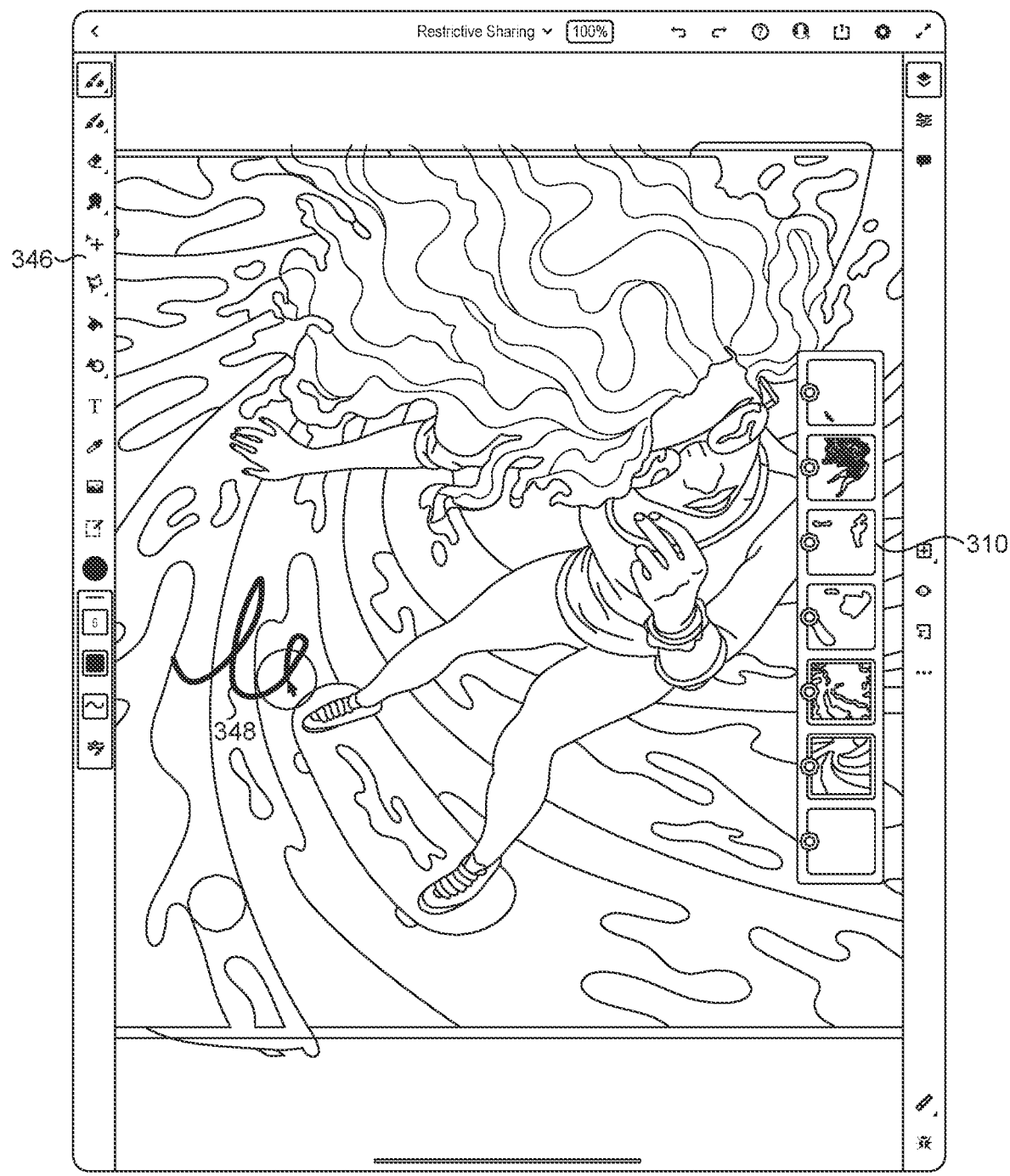

With reference now to FIG. 3C, assume a collaborator, such as collaborator 334 of FIG. 3B accesses the document and desires to edit the document. For example, assume the collaborator selects layer 310. As editing is enabled in association with the layer 310 for collaborator 334, the collaborator may use editing tools 346 to edit the document. As shown, the collaborator 334 has provided edit 348 to the document. Although not illustrated, as the collaborator has editing access to layer 310, if the collaborator selects to view a menu in association with layer 310, the menu may include various layer actions (e.g., actions available to perform in association with the layer). In some cases, the menu presented to the collaborator may be the same as menu 319 presented to the document owner, as both the document owner and collaborator are enabled to edit layer 310.

Figure 3D:
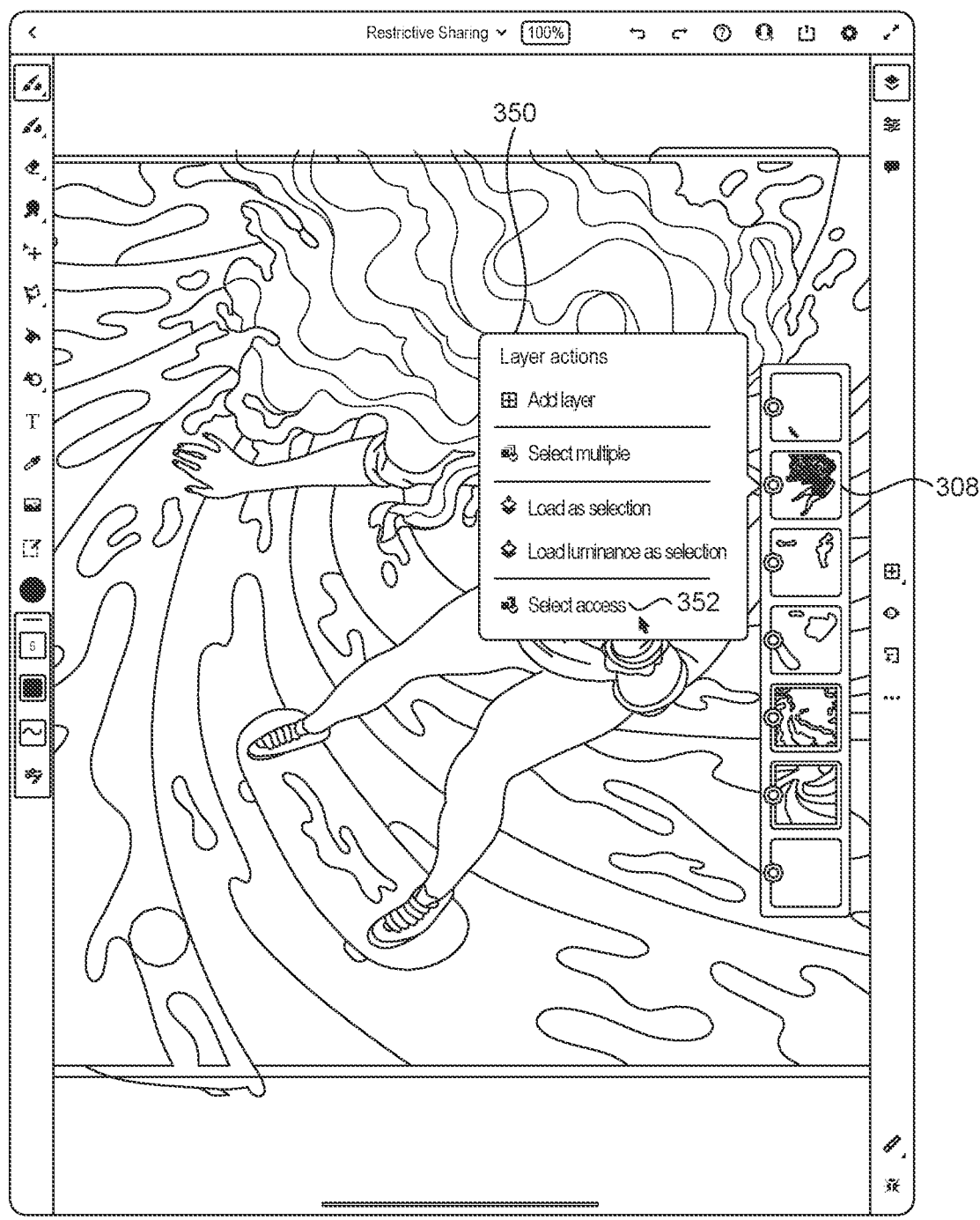

Turning to FIG. 3D, now assume the collaborator desires to provide an edit in relation to layer 308 and, as such, selects layer 308. Further assume that with regard to layer 308, the document owner selected to prohibit edits from the collaborator in association with layer 308. The collaborator may desire to make changes or view modification options and, as such, selects to view a menu in association with a particular layer. For example, the document owner selects layer 308 and, in association with selecting layer 308, the document owner may select to view a menu (e.g., right clicking on the layer representation 308). As shown, a menu 350 may be presented with various options available for the collaborator. In this example, the menu 350 has limited options available to the collaborator as the collaborator is disabled from providing edits in association with layer 308. The collaborator may select the select access option 352 to view the configured collaboration controls for layer 308.

Figure 3E:
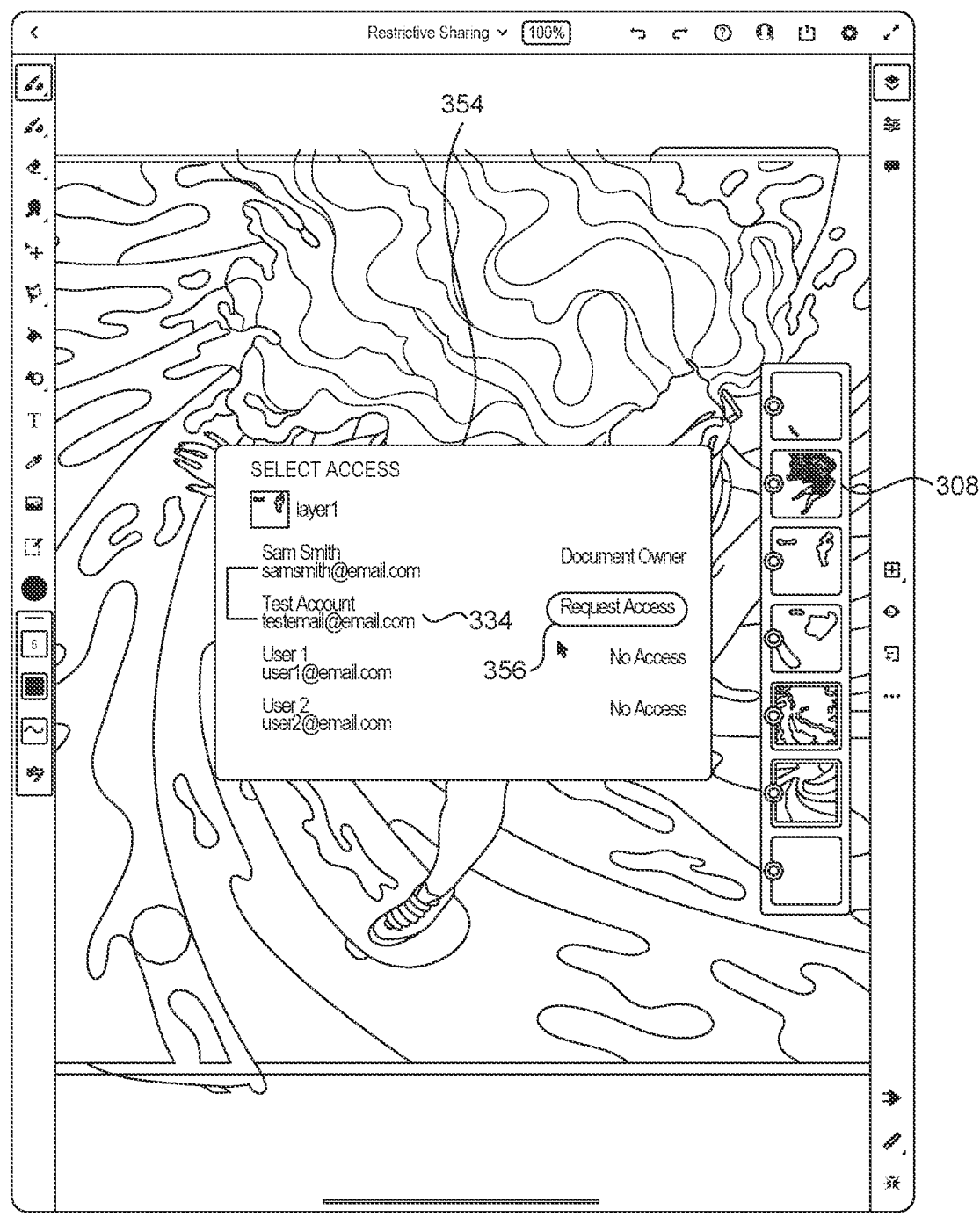
Figure 3F:
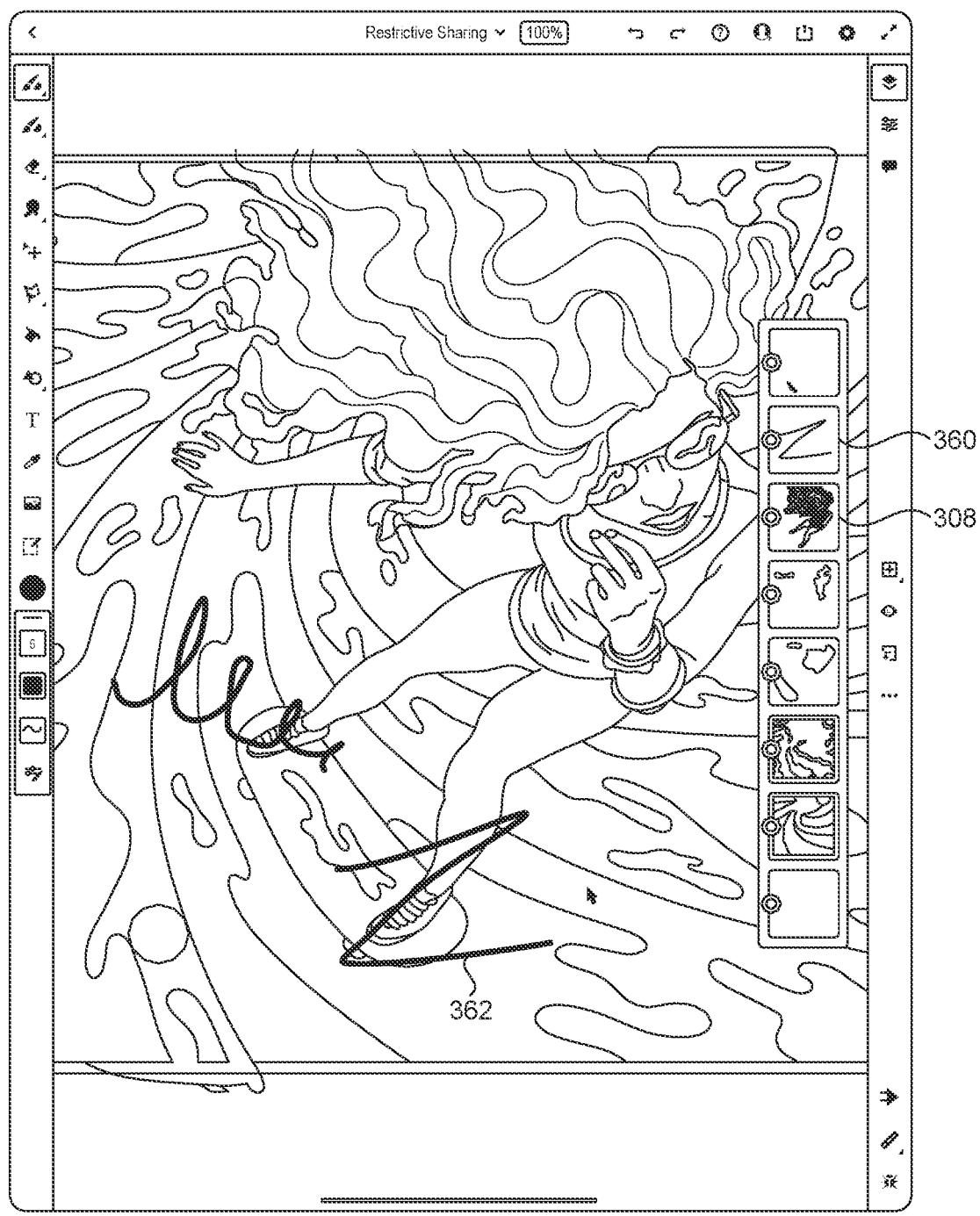

Upon selecting access option 352, a permission control panel 354 can be presented in association with layer 308, as shown in FIG. 3E. The permission control panel 354 indicates the collaborator 334 does not have access, as a request access link 356 is presented. The collaborator may select the request access link 356 to initiate a communication to the document owner indicating a desire of the collaborator to edit layer 308. As the editing for layer 308 remains disabled for the collaborator, the collaborator will be unable to provide edits to layer 308.

In association with editing being disabled for layer 308, in some cases, attempted edits are not applied to the layer. Alternatively or additionally, a notification may be presented to indicate edits are not permitted by the collaborator in association with the layer and/or editing tools may be disabled such that the collaborator cannot select any editing tools. In some embodiments, a new layer may be generated in which edits may be performed. For instance, and with reference to FIG. 3F, assume the collaborator provides an edit input in connection with layer 308 but that editing is disabled in connection with layer 308. In such a case, a new layer 360 containing collaborator edit 362 is generated. In this way, collaborator edit 362 is incorporated into the document, while layer 308 is maintained without any undesired edits provided by the collaborator. As such, the document owner may remove the edit by removing the new layer 360 without affecting layer 308 of the document.

Figure 4:
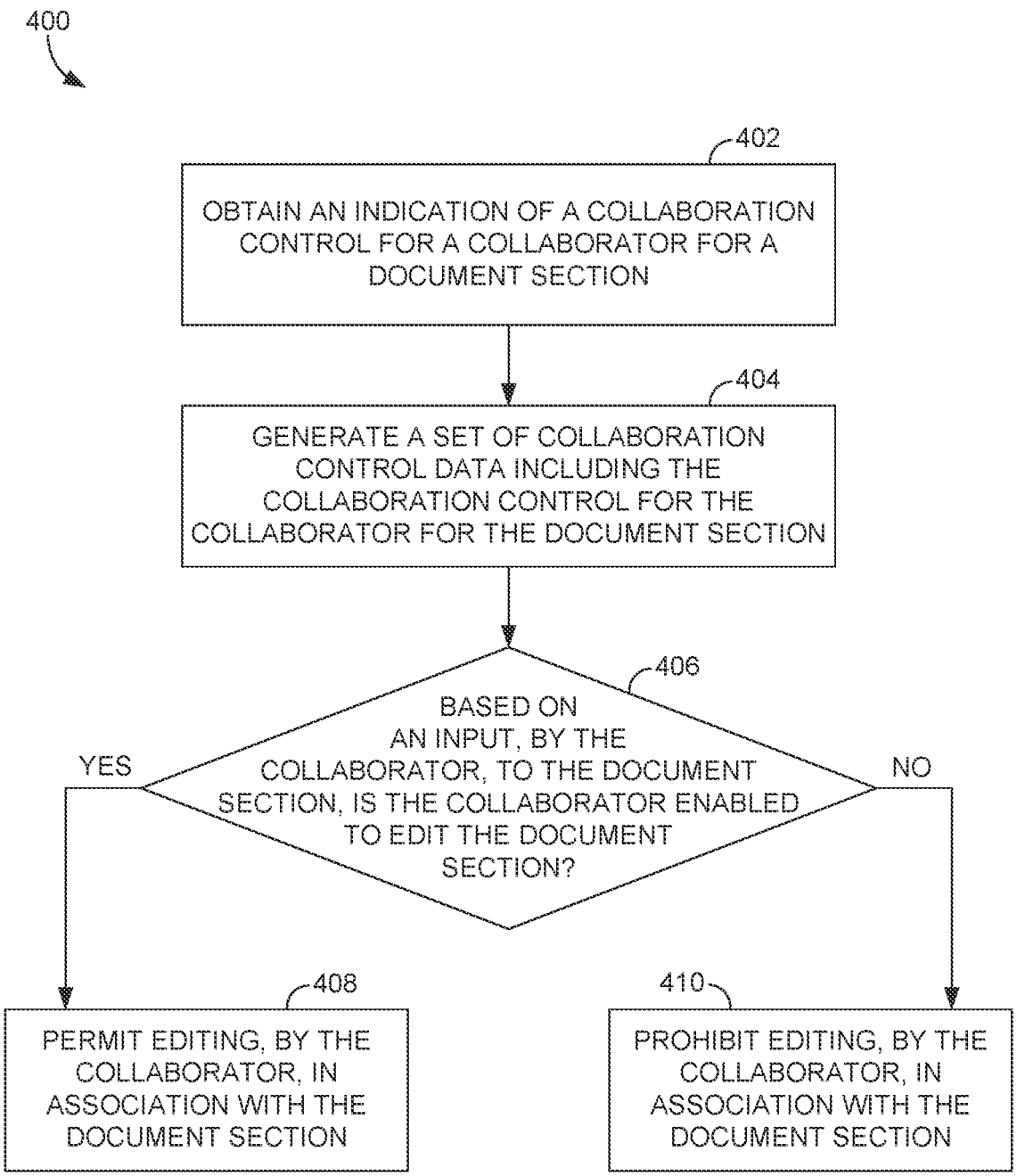
FIG. 4 provides one method for facilitating document collaboration in accordance with collaboration controls for document sections, in accordance with various embodiments of the present disclosure.
Figure 5:
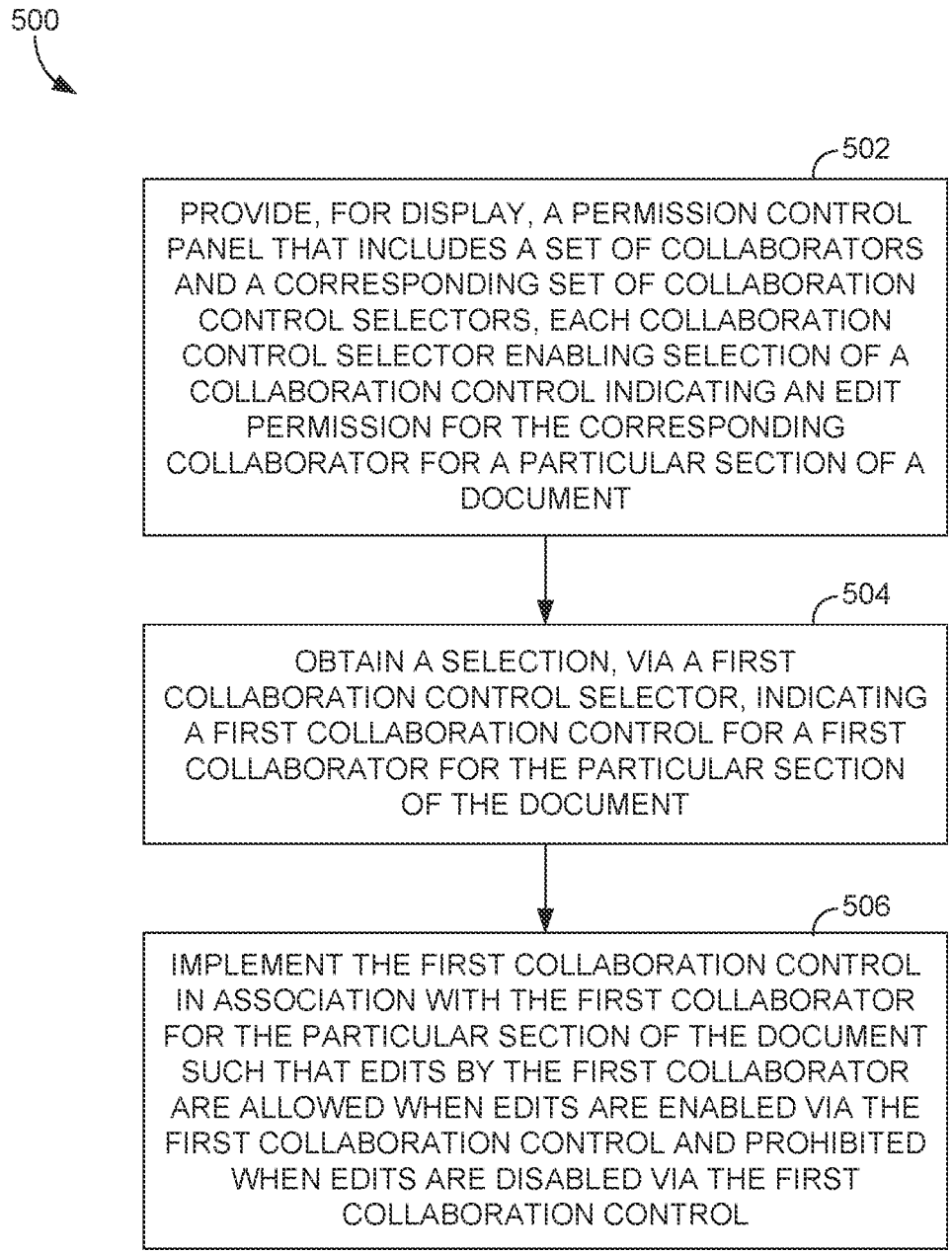
FIG. 5 provides another method for facilitating document collaboration in accordance with collaboration controls for document sections, in accordance with various embodiments of the present disclosure.
Figure 6:
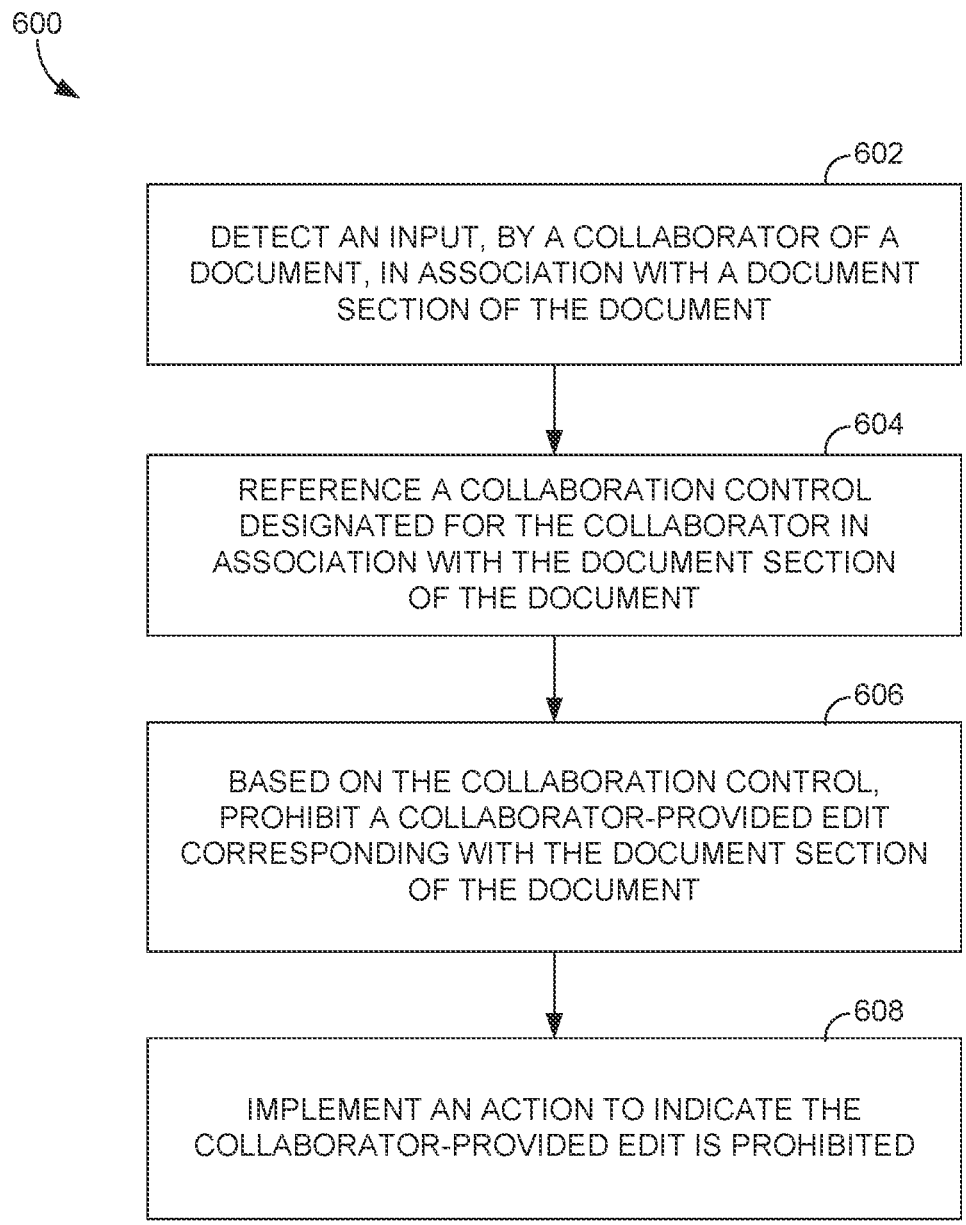
FIG. 6 provides another method for facilitating document collaboration in accordance with collaboration controls for document sections, in accordance with various embodiments of the present disclosure.

With reference to FIGS. 4-6, FIGS. 4-6 illustrate exemplary process flows in accordance with various embodiments described herein. Such process flows enable enhanced document collaboration in accordance with collaboration controls for document sections.

Turning initially to FIG. 4, FIG. 4 provides one method 400 for facilitating document collaboration in accordance with collaboration controls for document sections. At block 402, an indication of a collaboration control for a collaborator of a document is obtained. In embodiments, the collaboration control indicates an edit permission for a document section of the document in relation to the collaborator. In some cases, an indication of a collaboration control for a collaborator is obtained based on input via a permission control panel. A permission control panel may present a set of collaborators and a corresponding set of collaboration control selectors. The collaboration control selectors can be used to indicate edit permissions for the document section of the document. In this regard, a user, such as a document owner or section owner, can provide input via a collaboration control selector to indicate a collaboration control for a particular collaborator in relation to a particular document section.

At block 404, a set of collaboration control data for the document is generated. In embodiments, the set of collaboration control data includes the collaboration control indicating the edit permission for the document section of the document in relation to the collaborator. A set of collaboration control data may include, for a document section of the document, an association between collaborators and assigned collaboration controls for the collaborators. Collaboration control data may also include an indication of ownership of the document section. In some cases, the set of collaboration control data may include collaboration controls for collaborators in association with a plurality of document sections of the documents.

At block 406, based on an input, by the collaborator, to the document section of the document, a determination is made as to whether to enable an edit to the document section of the document. In some cases, the input may be an edit associated with the document section, such as addition of an object to the document section, a modification to an object in the document section, and/or a removal of an object in the document section. In other cases, the input may be an access of the document section. In this regard, edit enablement may be determined upon a user accessing the document section. Such a determination as to whether to enable editing can be made in any number of ways. As one example, the set of collaboration control data for the document can be accessed and, based on a collaboration control for the collaborator and the particular document section, a determination can be made. In cases that editing is enabled, as shown at block 408, editing in association with the document section is permitted by the collaborator. On the other hand, in cases that editing is disabled, as shown at block 410, editing by the collaborator is prohibited. In the event editing is disabled, a notification indicating that editing is disabled for the document section may be provided to the edit and/or a new document section in which edits may be provided can be initiated.

Turning to FIG. 5, FIG. 5 illustrates another process flow showing a method 500 for facilitating document collaboration in accordance with collaboration controls for document sections. Initially, at block 502 a permission control panel is providing, for display, the permission control panel including a set of collaborators and a corresponding set of collaboration control selectors. As described herein, collaboration control selectors enables selection of a collaboration control indicating an edit permission for the corresponding collaborator for a particular section of a document. A collaboration control selector may be in any of a number of forms, such as a button, checkbox, toggle, text input, menu, etc. A permission control panel may be displayed, for example to a document owner or section owner. Display of the permission control panel may occur at any time. As one example, the permission control panel may be displayed in response to a selection, by a user, to view the permission control panel in association with a particular document section. At block 504, a selection, via a first collaboration control selector, indicating a first collaboration control for a first collaborator for the particular section of the document is obtained. In this regard, a user may select that the first collaboration is enabled to edit the particular section of the document or disabled to edit the particular section of the document. Other collaboration controls are included in the scope of embodiments described herein. For example, the collaboration control may specify a type of editing or ownership permitted or prohibited by a collaborator in relation to a document section. At block 506, the first collaboration control is implemented in association with the first collaborator for the particular section of the document such that edits by the first collaborator are allowed when edits are enabled via the first collaboration control and prohibited when edits are disabled via the first collaboration control. In one embodiment, implementing the first collaboration control in association with the first collaborator for the particular section of the document includes incorporating an indication of the first collaboration control and an indication of the first collaborator in metadata associated with the particular section of the document. In some cases, implementing the first collaboration control includes enabling edits by the first collaborator to the particular section of the document when the first collaboration control permits edits by the first collaborator in association with the particular section. In other cases, implementing the first collaboration control includes preventing edits by the first collaborator to the particular section of the document when the first collaboration control prohibits edits by the first collaboration in association with the particular section.

With respect to FIG. 6, FIG. 6 illustrates another process flow showing a method 600 for facilitating document collaboration in accordance with collaboration controls for document sections. Initially, at block 602, an input, by a collaborator of a document, is detected in association with a document section of the document. At block 604, a collaboration control designated for the collaborator in association with the document section of the document is referenced. In some cases, the collaboration control indicates the collaborator is disabled from providing edits in association with the document section of the document. At block 606, based on the collaboration control, a collaborator-provided edit corresponding with the document section of the document is prohibited. At block 608, an action is taken to indicate the collaborator-provided edit is prohibited. In some embodiments, the action is providing, for display, a notification indicating edits by the collaborator are disabled for the document section. Alternatively or additionally, the action is automatically initiated or generating a new section of the document in which edits by the collaborator are permitted. As can be appreciated, an input (e.g., edit) by the collaborator to another document section may be enabled based on a collaboration control (e.g., enabling edits) designated for the collaborator in association with the other document section of the document. Further, an input (e.g., edit attempt) in association with the document section of the document by another collaborator may be enabled or disabled from edits based on a collaboration control for that collaborator. As such, while one collaborator may not be able to provide edits for a document section, another collaborator may be permitted to provided edits for the document section.

Figure 7:
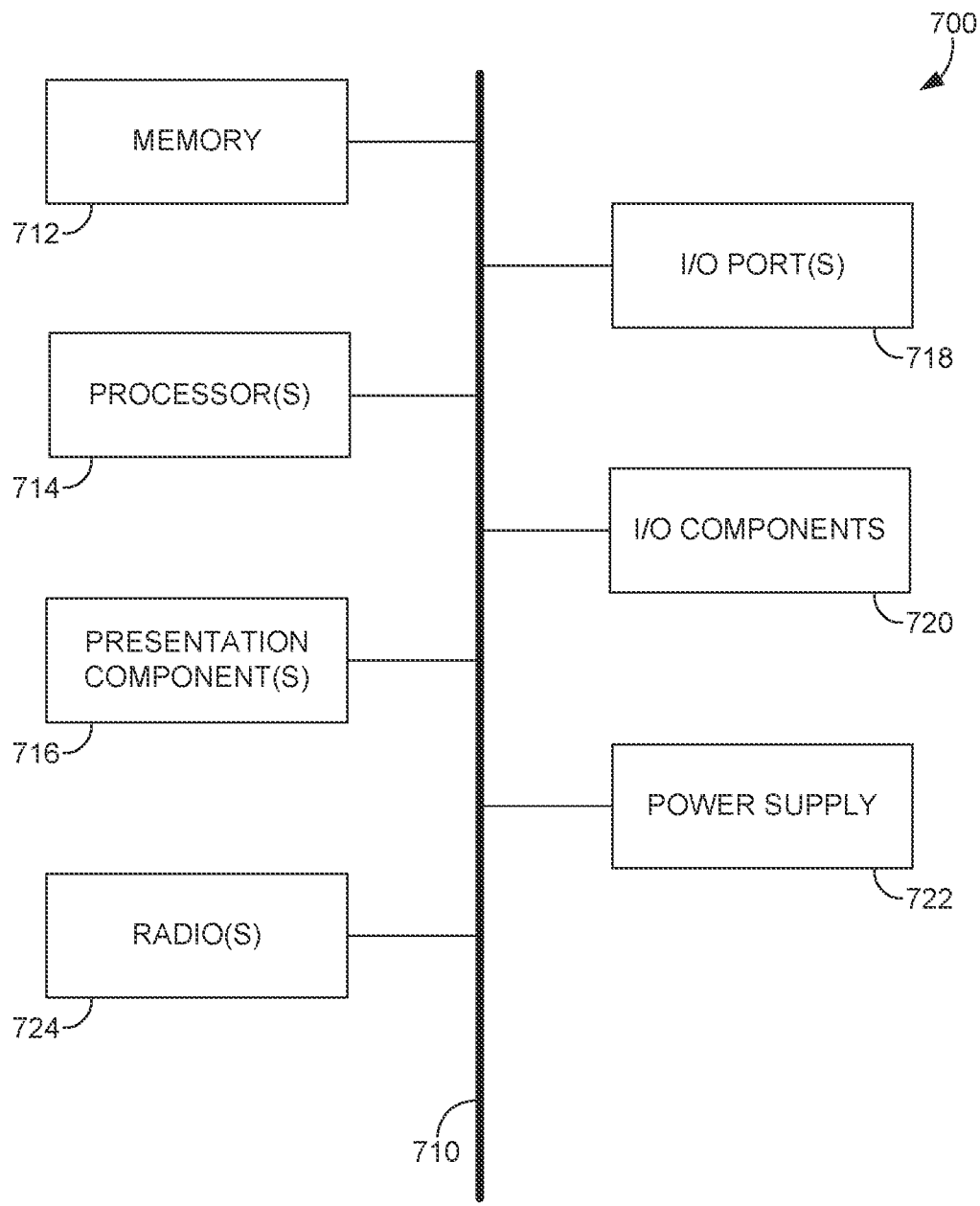
FIG. 7 is a block diagram of an example computing device in which embodiments of the present disclosure may be employed.

Having described embodiments of the present invention, FIG. 7 provides an example of a computing device in which embodiments of the present invention may be employed.

Computing device 700 includes bus 710 that directly or indirectly couples the following devices: memory 712, one or more processors 714, one or more presentation components 716, input/output (I/O) ports 718, input/output components 720, and illustrative power supply 722. Bus 710 represents what may be one or more busses (such as an address bus, data bus, or combination thereof). Although the various blocks of FIG. 7 are shown with lines for the sake of clarity, in reality, delineating various components is not so clear, and metaphorically, the lines would more accurately be gray and fuzzy. For example, one may consider a presentation component such as a display device to be an I/O component. Also, processors have memory. The inventors recognize that such is the nature of the art and reiterate that the diagram of FIG. 7 is merely illustrative of an exemplary computing device that can be used in connection with one or more embodiments of the present invention. Distinction is not made between such categories as "workstation," "server," "laptop," "handheld device," etc., as all are contemplated within the scope of FIG. 8 and reference to "computing device."

Computing device 700 typically includes a variety of computer-readable media. Computer-readable media can be any available media that can be accessed by computing device 700 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVDs) or other optical disk storage, magnetic cassettes, magnetic tape, magnetic disk storage or other magnetic storage devices, or any other medium which can be used to store the desired information and which can be accessed by computing device 700. Computer storage media does not comprise signals per se. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media, such as acoustic, RF, infrared, and other wireless media. Combinations of any of the above should also be included within the scope of computer-readable media.

Memory 712 includes computer storage media in the form of volatile and/or nonvolatile memory. As depicted, memory 712 includes instructions 724. Instructions 724, when executed by processor(s) 714 are configured to cause the computing device to perform any of the operations described herein, in reference to the above discussed figures, or to implement any program modules described herein. The memory may be removable, non-removable, or a combination thereof. Exemplary hardware devices include solid-state memory, hard drives, optical-disc drives, etc. Computing device 700 includes one or more processors that read data from various entities such as memory 712 or I/O components 720. Presentation component(s) 716 present data indications to a user or other device. Exemplary presentation components include a display device, speaker, printing component, vibrating component, etc.

I/O ports 718 allow computing device 700 to be logically coupled to other devices including I/O components 720, some of which may be built in. Illustrative components include a microphone, joystick, game pad, satellite dish, scanner, printer, wireless device, etc. I/O components 720 may provide a natural user interface (NUI) that processes air gestures, voice, or other physiological inputs generated by a user. In some instances, inputs may be transmitted to an appropriate network element for further processing. An NUI may implement any combination of speech recognition, touch and stylus recognition, facial recognition, biometric recognition, gesture recognition both on screen and adjacent to the screen, air gestures, head and eye tracking, and touch recognition associated with displays on computing device 700. Computing device 700 may be equipped with depth cameras, such as stereoscopic camera systems, infrared camera systems, RGB camera systems, and combinations of these, for gesture detection and recognition. Additionally, computing device 700 may be equipped with accelerometers or gyroscopes that enable detection of motion. The output of the accelerometers or gyroscopes may be provided to the display of computing device 700 to render immersive augmented reality or virtual reality.

Embodiments presented herein have been described in relation to particular embodiments which are intended in all respects to be illustrative rather than restrictive. Alternative embodiments will become apparent to those of ordinary skill in the art to which the present disclosure pertains without departing from its scope.

Various aspects of the illustrative embodiments have been described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features have been omitted or simplified in order not to obscure the illustrative embodiments.

Various operations have been described as multiple discrete operations, in turn, in a manner that is most helpful in understanding the illustrative embodiments; however, the order of description should not be construed as to imply that these operations are necessarily order dependent. In particular, these operations need not be performed in the order of presentation. Further, descriptions of operations as separate operations should not be construed as requiring that the operations be necessarily performed independently and/or by separate entities. Descriptions of entities and/or modules as separate modules should likewise not be construed as requiring that the modules be separate and/or perform separate operations. In various embodiments, illustrated and/or described operations, entities, data, and/or modules may be merged, broken into further sub-parts, and/or omitted.

The phrase "in one embodiment" or "in an embodiment" is used repeatedly. The phrase generally does not refer to the same embodiment; however, it may. The terms "comprising," "having," and "including" are synonymous, unless the context dictates otherwise. The phrase "A/B" means "A or B." The phrase "A and/or B" means "(A), (B), or (A and B)."

The phrase "at least one of A, B and C" means "(A), (B), (C), (A and B), (A and C), (B and C) or (A, B and C)."

What is claimed is:

1. A method comprising:
   obtaining an indication of a collaboration control for a collaborator of a document, the collaboration control indicating an edit permission for a document layer of a graphical design of the document in relation to the collaborator;
   generating a set of collaboration control data for the document, the set of collaboration control data including the collaboration control indicating the edit permission for the document layer of the graphical design of the document in relation to the collaborator;
   based on an input, by the collaborator, to the document layer of the graphical design of the document, determining, using the set of collaboration control data, whether to enable an edit to the document layer of the graphical design of the document; and
   in accordance with determining to disable the edit to the document layer of the graphical design of the document, initiating a new document layer of the graphical design in the document in which the collaborator is enabled to provide edits.

2. The method of claim 1, further comprising providing, for display via a permission control panel, a set of collaborators and a corresponding set of collaborators control selectors used to indicate edit permissions for the document layer of the graphical design of the document.

3. The method of claim 2, wherein the indication of the collaboration control for the collaborator is obtained based on a selection of the collaboration control via a collaborator control selector of the permission control panel.

4. The method of claim 1, wherein the set of collaboration control data includes, for the document layer of the graphical design of the document, collaboration controls corresponding with a plurality of collaborators.

5. The method of claim 1, wherein the set of collaboration control data includes, for the document layer of the graphical design of the document, an indication of ownership of the document layer of the graphical design.

6. The method of claim 1, wherein the set of collaboration control data includes collaboration controls for collaborators for a plurality of document layers of the graphical design of the document.

7. The method of claim 1, wherein the input comprises an addition of an object to the document layer of the graphical design of the document, a modification of an object in the document layer of the graphical design, or a removal of an object in the document layer of the graphical design.

8. The method of claim 1, wherein the input comprises an access of the document layer of the graphical design.

9. The method of claim 1, wherein determining whether to enable an edit to the document layer of the graphical design of the document comprises:
   accessing the set of collaboration control data for the document;
   based on a collaboration control, in the set of collaboration control data, for the collaborator and that corresponds with the document layer of the graphical design, determining that editing is disabled.

10. The method of claim 9 further comprising providing a notification indicating that editing is disabled for the document layer of the graphical design.

11. A non-transitory computer-readable medium storing executable instructions, which when executed by a processing device, cause the processing device to perform operations comprising:
    obtaining a selection of a representation of a particular layer of a graphical design of a document, from among a plurality of representations of layers of the graphical design of the document;
    based on the selection of the representation of the particular layer, providing, for display, a permission control panel, the permission control panel including a set of collaborators and a corresponding set of collaboration control selectors, wherein each collaboration control selector enables selection of a collaboration control indicating an edit permission for the corresponding collaborator for the particular layer of the graphical design of the document;
    obtaining a selection, via a first collaboration control selector, indicating a first collaboration control for a first collaborator for the particular layer of the graphical design of the document; and
    implementing the first collaboration control in association with the first collaborator for the particular layer of the graphical design of the document such that edits by the first collaborator are prohibited in association with the particular layer of the graphical design of the document and a new layer of the graphical design of the document is initiated when an edit input by the first collaborator is detected in association with the particular layer of the graphical design of the document.

12. The non-transitory computer-readable medium of claim 11, wherein implementing the first collaboration control in association with the first collaborator for the particular layer of the graphical design of the document comprises including an indication of the first collaboration control and an indication of the first collaborator in metadata associated with the particular layer of the graphical design of the document.

13. The non-transitory computer-readable medium of claim 11 further comprising:
    obtaining a second selection, via a second collaboration control selector, indicating a second collaboration control for a second collaborator for the particular layer of the graphical design of the document; and
    implementing the second collaboration control in association with the second collaborator for the particular layer of the graphical design of the document such that edits by the second collaborator are allowed when edits are enabled via the second collaboration control and prohibited when edits are disabled via the second collaboration control.

14. A system comprising:
    a memory component; and
    a processing device coupled to the memory component, the processing device to perform operations comprising:
    detecting an input, by a collaborator of a document, in association with a document layer of a graphical design of the document;
    referencing a collaboration control designated for the collaborator in association with the document layer of the graphical design of the document, the collaboration control indicating the collaborator is disabled from providing edits in association with the document layer of the graphical design of the document;

based on the collaboration control, prohibiting a collaborator-provided edit corresponding with the document layer of the graphical design of the document; and in accordance with the collaborator being disabled from providing edits in association with the document layer, initiating a new document layer of the graphical design in the document in which the collaborator is enabled to provide edits.

15. The system of claim 14 further comprising:

providing, for display, a notification indicating edits by the collaborator are disabled for the document layer of the graphical design.

16. The system of claim 14 further comprising:

detecting a second input, by the collaborator of the document, in association with a second document layer of the graphical design of the document;

referencing a second collaboration control designated for the collaborator in association with the second document layer of the graphical design of the document, the second collaboration control indicating the collaborator is enabled to provide edits in association with the second document layer of the graphical design of the document; and based on the second collaboration control, permitting a second collaborator-provided edit corresponding with the second document layer of the graphical design of the document.

17. The system of claim 14 further comprising:

detecting a second input, by a second collaborator of the document, in association with the document layer of the graphical design of the document;

referencing a second collaboration control designated for the second collaborator in association with the document layer of the graphical design of the document, the second collaboration control indicating the second collaborator is enabled to provide edits in association with the document layer of the graphical design of the document; and based on the second collaboration control, permitting a second collaborator-provided edit corresponding with the document layer of the graphical design of the document.

* * * * *